United States Patent
Park et al.

(10) Patent No.: US 10,042,731 B2
(45) Date of Patent: Aug. 7, 2018

(54) SYSTEM-ON-CHIP HAVING A SYMMETRIC MULTI-PROCESSOR AND METHOD OF DETERMINING A MAXIMUM OPERATING CLOCK FREQUENCY FOR THE SAME

(71) Applicant: SAMSUNG ELECTRONICS CO., LTD., Suwon-si, Gyeonggi-do (KR)

(72) Inventors: Jong-Lae Park, Anyang-si (KR); Byeong-Jun Lee, Seongnam-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 216 days.

(21) Appl. No.: 14/453,106

(22) Filed: Aug. 6, 2014

(65) Prior Publication Data

US 2015/0134995 A1 May 14, 2015

(30) Foreign Application Priority Data

Nov. 11, 2013 (KR) .......................... 10-2013-0136202

(51) Int. Cl.
G06F 1/32 (2006.01)
G06F 11/30 (2006.01)
G06F 1/20 (2006.01)

(52) U.S. Cl.
CPC .......... *G06F 11/3058* (2013.01); *G06F 1/206* (2013.01); *G06F 11/3006* (2013.01); *G06F 2201/81* (2013.01); *Y02D 10/16* (2018.01)

(58) Field of Classification Search
CPC ........................................................ G06F 1/32
See application file for complete search history.

(56) References Cited

U.S. PATENT DOCUMENTS 6,718,474 B1 * 4/2004 Somers ..................... G06F 1/08
  713/322
7,076,671 B2 7/2006 Espinoza-Ibarra et al.
7,520,669 B2 4/2009 Yazawa et al.
(Continued)

FOREIGN PATENT DOCUMENTS

JP 2005-085164 3/2005
KR 101065436 9/2011
KR 1020120063340 6/2012

*Primary Examiner* — Kim Huynh
*Assistant Examiner* — Eric Chang
(74) *Attorney, Agent, or Firm* — F. Chau & Associates, LLC

(57) ABSTRACT

A system-on-chip includes a symmetric multi-processor including a plurality of cores, each configured to operate in a high performance operating mode and a low performance operating mode. The system-on-chip further includes a clock management unit configured to provide an operating clock signal to the symmetric multi-processor, a state management unit configured to monitor operating states of the cores, a temperature management unit configured to monitor a temperature of the symmetric multi-processor, and a symmetric multi-processor control unit configured to determine the operating clock signal and the operating states of the cores based on a workload of the symmetric multi-processor. The symmetric multi-processor control unit is further configured to differentially determine a maximum operating clock frequency for the cores based on the temperature and the operating states of the cores, which indicate a quantity of cores that are currently in operation.

20 Claims, 14 Drawing Sheets

(56) References Cited

U.S. PATENT DOCUMENTS

| | | |
|---|---|---|
| 7,664,971 B2 | 2/2010 | Oh |
| 7,882,379 B2* | 2/2011 | Kanakogi |
| 9,436,245 B2* | 9/2016 | Bhandaru ................ G06F 1/26 |
| 2009/0089543 A1* | 4/2009 | Gunther ............. G06F 9/30181 |
| | | 712/30 |
| 2009/0164812 A1* | 6/2009 | Capps, Jr. ............ G06F 1/3203 |
| | | 713/320 |
| 2010/0058086 A1 | 3/2010 | Lee |
| 2010/0077236 A1 | 3/2010 | Trautman et al. |
| 2012/0060170 A1 | 3/2012 | Vajda |
| 2012/0159496 A1 | 6/2012 | Dighe et al. |
| 2012/0180062 A1 | 7/2012 | Sohi et al. |
| 2012/0185689 A1 | 7/2012 | Preston |
| 2012/0210164 A1 | 8/2012 | Gara et al. |
| 2013/0086395 A1* | 4/2013 | Liu ...................... G06F 9/5094 |
| | | 713/300 |

* cited by examiner

FIG. 8

MAX FREQUENCY (MHz)

| TEMP | CORE X 1 | CORE X 2 | CORE X 3 | CORE X 4 |
|---|---|---|---|---|
| 20 | 2000 | 2000 | 2000 | 2000 |
| 25 | 2000 | 2000 | 2000 | 2000 |
| 30 | 2000 | 2000 | 2000 | 2000 |
| 35 | 2000 | 2000 | 2000 | 1700 |
| 40 | 2000 | 2000 | 2000 | 1700 |
| 45 | 2000 | 2000 | 1700 | 1500 |
| 50 | 2000 | 2000 | 1700 | 1500 |
| 55 | 2000 | 1700 | 1500 | 1300 |
| 60 | 2000 | 1700 | 1500 | 1300 |
| 65 | 1700 | 1500 | 1300 | 1000 |
| 70 | 1700 | 1500 | 1300 | 1000 |
| 75 | 1500 | 1300 | 1000 | 800 |
| 80 | 1500 | 1300 | 1000 | 800 |
| 85 | 1300 | 1000 | 800 | LOW |
| 90 | 1300 | 800 | LOW | LOW |
| 95 | 800 | LOW | LOW | LOW |
| 100 | LOW | LOW | LOW | LOW |
| 105 | LOW | LOW | LOW | LOW |
| 110 | LOW | LOW | LOW | LOW |

FIG. 12

MAX FREQUENCY (MHz)

| TEMP | CORE X 1 | CORE X 2 | CORE X 3 | CORE X 4 |
|---|---|---|---|---|
| 20 | 2000 | 2000 | 2000 | 2000 |
| 25 | 2000 | 2000 | 2000 | 2000 |
| 30 | 2000 | 2000 | 2000 | 2000 |
| 35 | 2000 | 2000 | 2000 | 1700 |
| 40 | 2000 | 2000 | 2000 | 1700 |
| 45 | 2000 | 2000 | 1700 | 1500 |
| 50 | 2000 | 2000 | 1700 | 1500 |
| 55 | 2000 | 1700 | 1500 | 1300 |
| 60 | 2000 | 1700 | 1500 | 1300 |
| 65 | 1700 | 1500 | 1300 | 1000 |
| 70 | 1700 | 1500 | 1300 | 1000 |
| 75 | 1500 | 1300 | 1000 | 800 |
| 80 | 1500 | 1300 | 1000 | 800 |
| 85 | 1300 | 1000 | 800 | OFF |
| 90 | 1300 | 800 | OFF | OFF |
| 95 | 800 | OFF | OFF | OFF |
| 100 | OFF | OFF | OFF | OFF |
| 105 | OFF | OFF | OFF | OFF |
| 110 | OFF | OFF | OFF | OFF |

SYSTEM-ON-CHIP HAVING A SYMMETRIC MULTI-PROCESSOR AND METHOD OF DETERMINING A MAXIMUM OPERATING CLOCK FREQUENCY FOR THE SAME

CROSS-REFERENCE TO RELATED APPLICATIONS

This application claims priority under 35 USC § 119 to Korean Patent Application No. 10-2013-0136202, filed on Nov. 11, 2013, the disclosure of which is incorporated by reference herein in its entirety.

TECHNICAL FIELD

Exemplary embodiments relate to a system-on-chip (SoC), and more particularly, to a system-on-chip having a symmetric multi-processor (SMP), and a method of determining a maximum operating clock frequency for the same.

DISCUSSION OF THE RELATED ART

A mobile device (e.g., a smartphone) typically includes an application processor that controls operations of at least one function module included in the mobile device. The application processor may be implemented using a system-on-chip (SoC). The application processor may include a symmetric multi-processor, and may perform high performance parallel processing. In this case, a plurality of cores (e.g., processors) included in the symmetric multi-processor may receive the same operating clock signal to perform an equivalent operation. In a conventional symmetric multi-processor, a maximum operating clock frequency for cores may be set to be a maximum tolerance value supported by hardware. In addition, the maximum operating clock frequency for the cores may be simultaneously reduced when a temperature of the cores becomes higher than a specific temperature due to operations of the cores. As a result, a time during which the conventional symmetric multi-processor operates with maximum performance may be limited because heat and power consumption of the conventional symmetric multi-processor may be increased in a short period of time. When the maximum operating clock frequency for the cores is suddenly reduced at the same time, a user may notice performance degradation due to the reduction of the maximum operating clock frequency for the cores.

SUMMARY

Exemplary embodiments provide a system-on-chip capable of efficiently reducing heat and power consumption of a symmetric multi-processor while sufficiently securing a time during which the symmetric multi-processor operates with maximum performance.

Exemplary embodiments further provide a method of determining a maximum operating clock frequency capable of efficiently reducing heat and power consumption of a symmetric multi-processor while sufficiently securing a time during which the symmetric multi-processor operates with maximum performance.

According to an exemplary embodiment, a system-on-chip includes a symmetric multi-processor including a plurality of cores, each configured to operate in a high performance operating mode and a low performance operating mode, a clock management unit configured to provide an operating clock signal to the symmetric multi-processor, a state management unit configured to monitor operating states of the cores, a temperature management unit configured to monitor a temperature of the symmetric multi-processor, and a symmetric multi-processor control unit configured to determine the operating clock signal and the operating states of the cores based on a workload of the symmetric multi-processor, and to differentially determine a maximum operating clock frequency for the cores based on the temperature and the operating states of the cores. The operating states of the cores indicate a quantity of cores of the symmetric multi-processor that are currently in operation.

In exemplary embodiments, the symmetric multi-processor control unit may differentially determine the maximum operating clock frequency for the cores while the symmetric multi-processor operates.

In exemplary embodiments, each of the cores may include a first sub-core configured to operate in the high performance operating mode, and a second sub-core configured to operate in the low performance operating mode. The first sub-core constitutes a first cluster of the symmetric multi-processor, and the second sub-core constitutes a second cluster of the symmetric multi-processor.

In exemplary embodiments, the symmetric multi-processor control unit may differentially determine the maximum operating clock frequency for the cores based on the temperature and the operating states of the cores when the temperature is between a first threshold temperature and a second threshold temperature that is set to be higher than the first threshold temperature.

In exemplary embodiments, the symmetric multi-processor control unit may determine the maximum operating clock frequency for the cores to be a maximum tolerance value when the temperature is lower than the first threshold temperature.

In exemplary embodiments, the symmetric multi-processor control unit may differentially determine the maximum operating clock frequency for the cores based on the temperature and the operating states of the cores, and may change a mode of at least one of the cores from the high performance operating mode to the low performance operating mode when the temperature is higher than the second threshold temperature.

In exemplary embodiments, the system-on-chip may be an application processor.

In exemplary embodiments, the state management unit may be a power management unit that is located internal or external to the application processor. The power management unit may monitor the operating states of the cores based on a voltage supplied to the application processor.

According to an exemplary embodiment, a system-on-chip includes a symmetric multi-processor including a plurality of cores, a clock management unit configured to provide an operating clock signal to the symmetric multi-processor, a state management unit configured to monitor operating states of the cores, a temperature management unit configured to monitor a temperature of the symmetric multi-processor, and a symmetric multi-processor control unit configured to determine the operating clock signal and the operating states of the cores based on a workload of the symmetric multi-processor, and to differentially determine a maximum operating clock frequency for the cores based on the temperature and the operating states of the cores. The operating states of the cores indicate a quantity of cores in the symmetric multi-processor that are currently in operation.

In exemplary embodiments, the symmetric multi-processor control unit may differentially determine the maximum operating clock frequency for the cores while the symmetric multi-processor is operating.

In exemplary embodiments, the symmetric multi-processor control unit may differentially determine the maximum operating clock frequency for the cores based on the temperature and the operating states of the cores when the temperature is between a first threshold temperature and a second threshold temperature that is set to be higher than the first threshold temperature.

In exemplary embodiments, the symmetric multi-processor control unit may determine the maximum operating clock frequency for the cores to be a maximum tolerance value when the temperature is lower than the first threshold temperature.

In exemplary embodiments, the symmetric multi-processor control unit may change a mode of at least one of the cores from an operating mode to a non-operating mode when the temperature is higher than the second threshold temperature.

In exemplary embodiments, the system-on-chip may be an application processor.

In exemplary embodiments, the state management unit may be a power management unit that is located internal or external to the application processor. The power management unit may monitor the operating states of the cores based on a voltage supplied to the application processor.

According to an exemplary embodiment, a method of determining a maximum operating clock frequency may determine a maximum operating clock frequency for cores of a symmetric multi-processor. The method may include an operation of differentially determining the maximum operating clock frequency for the cores based on a temperature of the symmetric multi-processor, and an operation of differentially determining the maximum operating clock frequency for the cores based on operating states of the cores. The operating states of the cores indicate a quantity of cores in operation of the symmetric multi-processor.

In exemplary embodiments, the maximum operating clock frequency for the cores may be differentially determined based on the temperature and the operating states of the cores when the temperature is between a first threshold temperature and a second threshold temperature that is set to be higher than the first threshold temperature.

In exemplary embodiments, the maximum operating clock frequency for the cores may be determined to be a maximum tolerance value when the temperature is lower than the first threshold temperature.

In exemplary embodiments, the maximum operating clock frequency for the cores may be differentially determined based on the temperature and the operating states of the cores, and a mode of at least one of the cores may be changed from the high performance operating mode to the low performance operating mode when the temperature is higher than the second threshold temperature.

In exemplary embodiments, the maximum operating clock frequency for the cores may be differentially determined based on the temperature and the operating states of the cores, and a mode of at least one of the cores may be changed from an operating mode to a non-operating mode when the temperature is higher than the second threshold temperature.

A system-on-chip according to exemplary embodiments may efficiently reduce heat and power consumption of a symmetric multi-processor while sufficiently securing a time during which the symmetric multi-processor operates with maximum performance by determining an operating clock signal and operating states of cores included in the symmetric multi-processor based on a workload of the symmetric multi-processor, and by differentially determining a maximum operating clock frequency for the cores based on a quantity of cores in operation and a temperature of the symmetric multi-processor.

A method of determining a maximum operating clock frequency according to exemplary embodiments may efficiently reduce heat and power consumption of a symmetric multi-processor while sufficiently securing a time during which the symmetric multi-processor operates with maximum performance by determining an operating clock signal and operating states of cores included in the symmetric multi-processor based on a workload of the symmetric multi-processor, and by differentially determining a maximum operating clock frequency for the cores based on a quantity of cores in operation and a temperature of the symmetric multi-processor.

BRIEF DESCRIPTION OF THE DRAWINGS

The above and other features of the present invention will become more apparent by describing in detail exemplary embodiments thereof with reference to the accompanying drawings, in which:

FIG. 8 is a diagram illustrating an example in which a maximum operating clock frequency for a symmetric multi-processor included in the system-on-chip of FIG. 5 is determined.

FIG. 12 is a diagram illustrating an example in which a maximum operating clock frequency for a symmetric multi-processor included in the system-on-chip of FIG. 10 is determined.

DETAILED DESCRIPTION OF THE EXEMPLARY EMBODIMENTS

Figure 1:
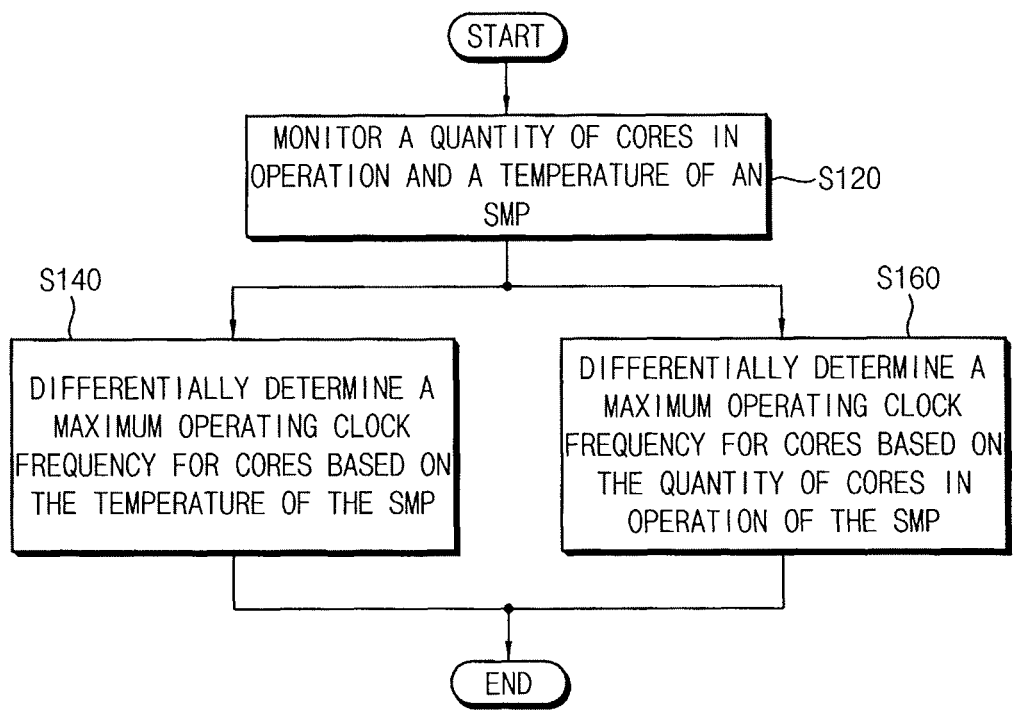
FIG. 1 is a flowchart illustrating a method of determining a maximum operating clock frequency for a symmetric multi-processor according to an exemplary embodiment.

Exemplary embodiments will be described more fully hereinafter with reference to the accompanying drawings. Like reference numerals may refer to like elements throughout the accompanying drawings.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present invention.

It will further be understood that when an element is referred to as being "connected" or "coupled" to another element, it can be directly connected or coupled to the other element or intervening elements may be present.

Figure 2:
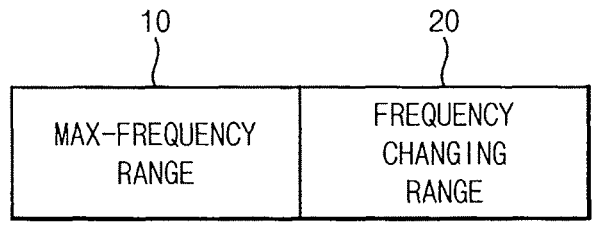
FIGS. 2 through 4 are diagrams illustrating examples in which a symmetric multi-processor operates according to the method of FIG. 1.
Figure 3:
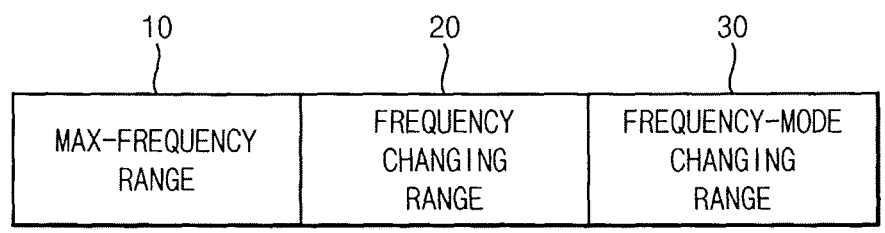
Figure 4:
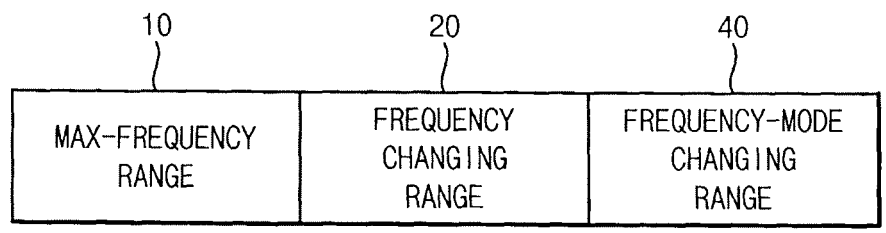

FIG. 1 is a flowchart illustrating a method of determining a maximum operating clock frequency for a symmetric multi-processor according to an exemplary embodiment. FIGS. 2 through 4 are diagrams illustrating examples in which a symmetric multi-processor operates according to the method of FIG. 1.

Referring to FIGS. 1 through 4, the method of FIG. 1 may determine the maximum operating clock frequency for the cores of the symmetric multi-processor. In an exemplary embodiment, the method of FIG. 1 monitors a quantity of cores in operation and a temperature of the symmetric multi-processor (SMP) (S120), differentially determines the maximum operating clock frequency for the cores based on the temperature of the symmetric multi-processor (S140), and differentially determines the maximum operating clock frequency for the cores based on the quantity of cores in operation (S160). Differentially determining the maximum operating clock frequency of the cores refers to individually determining the maximum operating clock frequency for each core. For example, a different maximum operating clock frequency may be determined for each core from among a plurality of cores. According to exemplary embodiments, a different maximum operating clock frequency may be determined for some or all of a plurality of cores.

Generally, the symmetric multi-processor refers to a processor that includes a plurality of cores (e.g., processors) that receive the same operating clock signal to perform an equivalent operation. Unlike an asymmetric multi-processor, the cores included in the symmetric multi-processor may not receive different operating clock signals. That is, the cores included in the symmetric multi-processor may receive the same operating clock signal. The symmetric multi-processor may be utilized in a mobile device (e.g., a smartphone). Since a mobile device operates using a battery, a reduction of power consumption is desirable. Accordingly, when the symmetric multi-processor is included in a system-on-chip (SoC) (e.g., an application processor (AP)), the system-on-chip may dynamically control/adjust an operating clock signal input to the symmetric multi-processor (e.g., an operating clock concurrently input to the cores of the symmetric multi-processor) based on a workload of the symmetric multi-processor. In addition, the system-on-chip may control a quantity of cores in operation when the workload of the symmetric multi-processor is relatively small. Thus, when the workload of the symmetric multi-processor is relatively small, at least one of the cores included in the symmetric multi-processor may not operate (e.g., a mode of at least one of the cores may be changed from an operating mode to a non-operating mode in view of the workload). For example, the operating clock signal may not be input to at least one of the cores included in the symmetric multi-processor.

In a conventional symmetric multi-processor, a maximum operating clock frequency for the cores may be set to a maximum tolerance value supported (e.g., assured) by hardware even when some of the cores do not operate in the conventional symmetric multi-processor. In addition, the maximum operating clock frequency for the cores may be simultaneously reduced when a temperature of the cores becomes higher than a specific temperature as a result of heat generated due to operation of the cores. This functionality may be the result of the mobile device employing a passive cooling technique that cools down the cores by limiting performance of the cores. A passive cooling technique may be employed because an active cooling technique that cools down the cores by, for example, using a cooling fan, may not be employed because of the small size of the mobile device. In this case, if the maximum operating clock frequency for the cores is set to be the maximum tolerance value, the battery life may be reduced as heat and power consumption of the symmetric multi-processor are increased. In addition, if the maximum operating clock frequency for the cores is suddenly reduced at the same time, a user may notice performance degradation due to the reduction of the maximum operating clock frequency for the cores.

The method of FIG. 1 may differentially determine the maximum operating clock frequency for the cores based on the quantity of cores in operation and the temperature of the symmetric multi-processor. For example, the method of FIG. 1 may monitor the quantity of cores in operation and the temperature of the symmetric multi-processor (S120), may differentially determine the maximum operating clock frequency for the cores based on the temperature of the symmetric multi-processor (S140), and may differentially determine the maximum operating clock frequency for the cores based on the quantity of cores in operation (S160). For example, the maximum operating clock frequency for the cores may decrease as the temperature of the symmetric multi-processor increases, and the maximum operating clock frequency for the cores may decrease as the quantity of cores in operation increases at the same temperature. The method of FIG. 1 may differentially determine the maximum operating clock frequency for the cores in an entire temperature range in which the symmetric multi-processor is capable of operating. In an exemplary embodiment, the performance of the symmetric multi-processor 110 may be limited in a high temperature range of the symmetric multi-processor 110, and may not be limited in a low temperature range of the symmetric multi-processor 110. Thus, in an exemplary embodiment, the method of FIG. 1 may differentially determine the maximum operating clock frequency for the cores only in a temperature range that is higher than a predetermined threshold temperature.

As illustrated in FIG. 2, when the method of FIG. 1 determines the maximum operating clock frequency for the cores of the symmetric multi-processor, the method of FIG. 1 may set a maximum tolerance value setting range 10 in which the maximum operating clock frequency for the cores is unconditionally set to be the maximum tolerance value, and a maximum operating clock frequency changing range 20 in which the maximum operating clock frequency for the cores is differentially determined based on the quantity of cores in operation and the temperature of the symmetric multi-processor. For example, in an exemplary embodiment, the method of FIG. 1 may determine the maximum operating clock frequency for the cores to be the maximum tolerance value when the temperature of the symmetric multi-processor is lower than a first threshold temperature, and may differentially determine the maximum operating clock frequency for the cores based on the quantity of cores in operation and the temperature of the symmetric multi-processor only when the temperature of the symmetric multi-processor is higher than the first threshold temperature.

As illustrated in FIG. 3, when the method of FIG. 1 determines the maximum operating clock frequency for the cores of the symmetric multi-processor, the method of FIG. 1 may set the maximum tolerance value setting range 10 in which the maximum operating clock frequency for the cores is unconditionally set to be the maximum tolerance value, set the maximum operating clock frequency changing range 20 in which the maximum operating clock frequency for the cores is differentially determined based on the quantity of cores in operation and the temperature of the symmetric multi-processor, and set an operating mode changing range 30 in which the maximum operating clock frequency for the cores is differentially determined based on the quantity of cores in operation and the temperature of the symmetric multi-processor, and a mode of at least one of the cores is changed from a high performance operating mode to a low performance operating mode. Each of the cores included in the symmetric multi-processor may operate in the high performance operating mode or in the low performance operating mode. For example, each of the cores included in the symmetric multi-processor may include a first sub-core that operates in the high performance operating mode and a second sub-core that operates in the low performance operating mode. In this case, a situation in which a core operates in the high performance operating mode may indicate that the first sub-core of the core operates, and a situation in which a core operates in the low performance operating mode may indicate that the second sub-core of the core operates. The first sub-cores of the cores may constitute a first cluster of the symmetric multi-processor, and the second sub-cores of the cores may constitute a second cluster of the symmetric multi-processor.

Thus, the method of FIG. 1 may determine the maximum operating clock frequency for the cores to be the maximum tolerance value when the temperature of the symmetric multi-processor is lower than the first threshold temperature, and may differentially determine the maximum operating clock frequency for the cores based on the quantity of cores in operation and the temperature of the symmetric multi-processor when the temperature of the symmetric multi-processor is between the first threshold temperature and a second threshold temperature that is set to be higher than the first threshold temperature. In addition, the method of FIG. 1 may differentially determine the maximum operating clock frequency for the cores based on the quantity of cores in operation and the temperature of the symmetric multi-processor, and may change a mode of at least one of the cores included in the symmetric multi-processor from the high performance operating mode to the low performance operating mode when the temperature of the symmetric multi-processor is higher than the second threshold temperature. For example, the maximum operating clock frequency for the cores may decrease as the quantity of cores in operation increases at a specific temperature. In addition, a mode of at least one of the cores included in the symmetric multi-processor may be changed from the high performance operating mode to the low performance operating mode when the quantity of cores in operation becomes larger than a predetermined number at the specific temperature. As a result, the method of FIG. 1 may efficiently lower the temperature of the symmetric multi-processor compared to methods that reduce only the maximum operating clock frequency for the cores of the symmetric multi-processor because a mode of at least one of the cores included in the symmetric multi-processor is changed from the high performance operating mode to the low performance operating mode.

As illustrated in FIG. 4, when the method of FIG. 1 determines the maximum operating clock frequency for the cores included in the symmetric multi-processor, the method of FIG. 1 may set the maximum tolerance value setting range 10 in which the maximum operating clock frequency for the cores is unconditionally set to be the maximum tolerance value, set the maximum operating clock frequency changing range 20 in which the maximum operating clock frequency for the cores is differentially determined based on the quantity of cores in operation and the temperature of the symmetric multi-processor, and set an operating mode changing range 40 in which the maximum operating clock frequency for the cores is differentially determined based on the quantity of cores in operation and the temperature of the symmetric multi-processor, and a mode of at least one of the cores is changed from an operating mode to a non-operating mode. Thus, the method of FIG. 1 may determine the maximum operating clock frequency for the cores to be the maximum tolerance value when the temperature of the symmetric multi-processor is lower than the first threshold temperature, and may differentially determine the maximum operating clock frequency for the cores based on the quantity of cores in operation and the temperature of the symmetric multi-processor when the temperature of the symmetric multi-processor is between the first threshold temperature and the second threshold temperature. In addition, the method of FIG. 1 may differentially determine the maximum operating clock frequency for the cores based on the quantity of cores in operation and the temperature of the symmetric multi-processor, and may change a mode of at least one of the cores included in the symmetric multi-processor from the operating mode to the non-operating mode when the temperature of the symmetric multi-processor is higher than the second threshold temperature. For example, the maximum operating clock frequency for the cores may decrease as the quantity of cores in operation increases at a specific temperature. In addition, a mode of at least one of the cores included in the symmetric multi-processor may be changed from the operating mode to the non-operating mode when the quantity of cores in operation becomes larger than a predetermined number at the specific temperature. As a result, the method of FIG. 1 may efficiently lower the temperature of the symmetric multi-processor compared to methods that reduce only the maximum operating clock frequency for the cores of the symmetric multi-processor because a mode of at least one of the cores included in the symmetric multi-processor is changed from the operating mode to the non-operating mode.

As described above, the method of FIG. 1 may efficiently reduce heat and power consumption of the symmetric multi-processor while sufficiently securing a time during which the symmetric multi-processor operates with maximum performance by determining the operating clock and the operating states of the cores included in the symmetric multi-processor based on the workload of the symmetric multi-processor, and by differentially determining the maximum operating clock frequency for the cores included in the symmetric multi-processor based on the operating states of the cores and the temperature of the symmetric multi-processor, where the operating states of the cores indicate the quantity of cores in operation of the symmetric multi-processor. In an exemplary embodiment, the method of FIG. 1 may differentially determine the maximum operating clock frequency for the cores of the symmetric multi-processor in real-time while the symmetric multi-processor operates. In an exemplary embodiment, the method of FIG. 1 may differentially determine the maximum operating clock frequency for the cores of the symmetric multi-processor while the symmetric multi-processor does not operate. When the maximum tolerance value setting range 10, the maximum operating clock frequency changing range 20, and the operating mode changing ranges 30 and 40 are set by the method of FIG. 1 based on the first and second threshold temperatures, the first and second threshold temperatures may be variously set according to requirements of the symmetric multi-processor.

Figure 5:
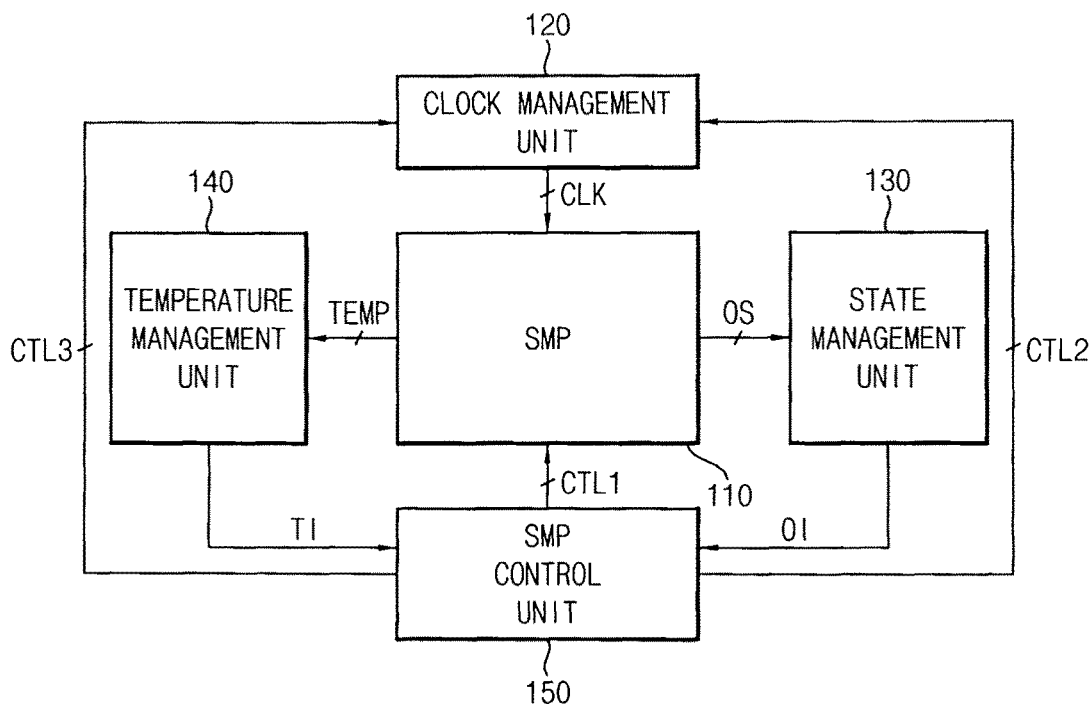
FIG. 5 is a block diagram illustrating a system-on-chip according to an exemplary embodiment.
Figure 6:
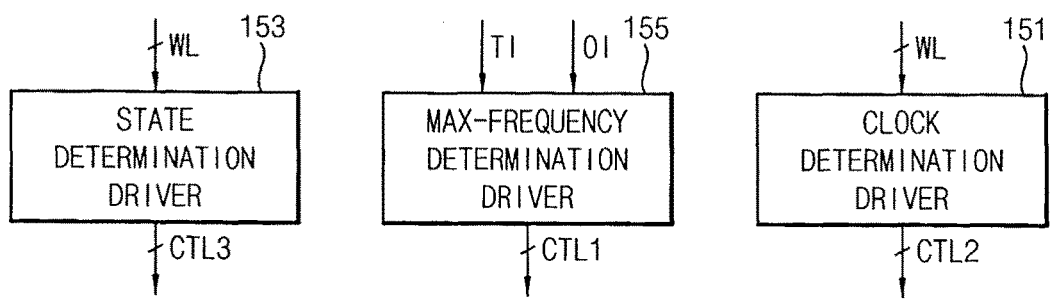
FIG. 6 is a block diagram illustrating a symmetric multi-processor (SMP) control unit included in the system-on-chip of FIG. 5 according to an exemplary embodiment.

FIG. 5 is a block diagram illustrating a system-on-chip according to an exemplary embodiment. FIG. 6 is a block diagram illustrating a symmetric multi-processor (SMP) control unit included in the system-on-chip of FIG. 5 according to an exemplary embodiment.

Referring to FIGS. 5 and 6, the system-on-chip 100 may include a symmetric multi-processor 110, a clock management unit 120, a state management unit 130, a temperature management unit 140, and an SMP control unit 150. In exemplary embodiments, the system-on-chip 100 may be an application processor (AP).

The symmetric multi-processor 110 may include a plurality of cores (e.g., processors) that receives the same operating clock signal CLK to perform an equivalent operation. The symmetric multi-processor 110 may include a plurality of cores, each of which selectively operates in a high performance operating mode or a low performance operating mode. In an exemplary embodiment, the symmetric multi-processor 110 may be, for example, a big-little processor (e.g., a multi-processor including high-performance sub-cores and low-performance sub-cores). In this case, each of the cores may include a first sub-core (e.g., an ARM Cortex-A15) that operates in the high performance operating mode and a second sub-core (e.g., an ARM Cortex-A7) that operates in the low performance operating mode. It is to be understood that the ARM Cortex-A15 and ARM Cortex-A7 sub-cores are exemplary, and exemplary embodiments are not limited thereto. The first sub-cores of the cores may constitute a first cluster of the symmetric multi-processor 110, and the second sub-cores of the cores may constitute a second cluster of the symmetric multi-processor 110. For example, a situation in which a core operates in the high performance operating mode may indicate that the first sub-core of the core operates, and a situation in which a core operates in the low performance operating mode may indicate that the second sub-core of the core operates.

The clock management unit 120 may provide the operating clock signal CLK to the symmetric multi-processor 110. The operating clock signal CLK may be determined by the SMP control unit 150 based on a workload WL of the symmetric multi-processor 110. For example, when the workload WL of the symmetric multi-processor 110 is relatively large, the clock management unit 120 may provide a relatively high operating clock signal CLK to the cores of the symmetric multi-processor 110 based on a control signal CTL2 output from the SMP control unit 150. Alternatively, when the workload WL of the symmetric multi-processor 110 is relatively small, the clock management unit 120 may provide a relatively low operating clock signal CLK to the cores of the symmetric multi-processor 110 based on the control signal CTL2 output from the SMP control unit 150.

The state management unit 130 may monitor operating states OS of the cores, and may provide information OI relating to the operating states OS of the cores to the SMP control unit 150. The operating states OS of the cores may include an active state and an inactive state. For example, the active state may correspond to an operating mode, and the inactive state may correspond to a non-operating mode. In exemplary embodiments, the state management unit 130 may be a power management unit (e.g., a power management integrated circuit (PMIC)) that is located internal or external to the system-on-chip 100, and the power management unit may monitor the operating states OS of the cores based on a voltage supplied to the system-on-chip 100. Alternatively, the state management unit 130 may be implemented using a separate circuit that monitors only the operating states OS of the cores of the symmetric multi-processor 100. The operating states OS of the cores may be determined based on the workload WL of the symmetric multi-processor 110 by the SMP control unit 150. For example, when the workload WL of the symmetric multi-processor 110 is relatively large, all cores of the symmetric multi-processor 110 may operate. Alternatively, when the workload WL of the symmetric multi-processor 110 is relatively small, some cores of the symmetric multi-processor 110 may operate. For example, the operating states OS of the cores of the symmetric multi-processor 110 may be determined in a manner in which the clock management unit 120 supplies or blocks the operating clock signal CLK to/from respective cores of the symmetric multi-processor 110. That is, when the workload WL of the symmetric multi-processor 110 is relatively large, the clock management unit 120 may supply the operating clock signal CLK to all cores of the symmetric multi-processor 110 based on a control signal CTL3 output from the SMP control unit 150. Alternatively, when the workload WL of the symmetric multi-processor 110 is relatively small, the clock management unit 120 may block the operating clock signal CLK from some cores of the symmetric multi-processor 110 based on the control signal CTL3 output from the SMP control unit 150.

The temperature management unit 140 may monitor a temperature TEMP of the symmetric multi-processor 110, and may provide information TI relating to the temperature TEMP of the symmetric multi-processor 110 to the SMP control unit 150. In exemplary embodiments, the temperature TEMP of the symmetric multi-processor 110 may be, for example, an average temperature of the cores of the symmetric multi-processor 110 or a maximum temperature from among temperatures of the cores of the symmetric multi-processor 110. However, a determination of the temperature TEMP of the symmetric multi-processor 110 is not limited thereto.

As described above, the SMP control unit 150 may determine the operating clock signal CLK that is provided to the symmetric multi-processor 110 and the operating states OS of the cores of the symmetric multi-processor 110 based on the workload WL of the symmetric multi-processor 110. Thus, the SMP control unit 150 may provide the control signals CTL2 and CTL3 to the clock management unit 120.

In addition, the SMP control unit 150 may receive the information OI relating to the operating states OS of the cores from the state management unit 130, may receive the information TI relating to the temperature TEMP of the symmetric multi-processor 110 from the temperature management unit 140, and may differentially determine a maximum operating clock frequency for the cores of the symmetric multi-processor 110 based on a quantity of cores in operation (e.g., the operating states OS of the cores) and the temperature TEMP of the symmetric multi-processor 110. The SMP control unit 150 may provide a control signal CTL1 to the symmetric multi-processor 110 based on this information.

Referring to FIG. 6, in an exemplary embodiment, the SMP control unit 150 may include a clock determination driver 151, a state determination driver 153, and a maximum operating clock frequency determination driver 155. The clock determination driver 151 may change the operating clock signal CLK that is provided to the symmetric multi-processor 110 by receiving the workload WL of the symmetric multi-processor 110, by determining the operating clock signal CLK that is provided to the symmetric multi-processor 110 based on the workload WL of the symmetric multi-processor 110, and by providing the control signal CTL2 to the clock management unit 120. The state determination driver 153 may change the operating states OS of the cores of the symmetric multi-processor 110 by receiving the workload WL of the symmetric multi-processor 110, by determining the operating states OS of the cores of the symmetric multi-processor 110 based on the workload WL of the symmetric multi-processor 110, and by providing the control signal CTL3 to the clock management unit 120. The maximum operating clock frequency determination driver 155 may differentially determine the maximum operating clock frequency for the cores of the symmetric multi-processor 110 by receiving the information TI relating to the temperature TEMP of the symmetric multi-processor 110 and the information OI relating to the operating states OS of the cores of the symmetric multi-processor 110, and by providing the control signal CTL1 to the symmetric multi-processor 110 based on the quantity of cores in operation (e.g., the operating states OS of the cores) and the temperature TEMP of the symmetric multi-processor 110. In exemplary embodiments, the clock determination driver 151, the state determination driver 153, and the maximum operating clock frequency determination driver 155 may be implemented using hardware (e.g., a circuit structure) and/or software (e.g., an operating system (OS), a computer program, etc).

The SMP control unit 150 may differentially determine the maximum operating clock frequency for the cores of the symmetric multi-processor 110 in an entire temperature range in which the symmetric multi-processor 110 is capable of operating. In an exemplary embodiment, the performance of the symmetric multi-processor 110 may be limited in a high temperature range of the symmetric multi-processor 110, and may not be limited in a low temperature range of the symmetric multi-processor 110. Thus, in an exemplary embodiment, the SMP control unit 150 may differentially determine the maximum operating clock frequency for the cores of the symmetric multi-processor 110 only in a temperature range that is higher than a predetermined threshold temperature. For example, the SMP control unit 150 may determine the maximum operating clock frequency for the cores of the symmetric multi-processor 110 to be a maximum tolerance value when the temperature TEMP of the symmetric multi-processor 110 is lower than a first threshold temperature. In addition, the SMP control unit 150 may differentially determine the maximum operating clock frequency for the cores of the symmetric multi-processor 110 based on the quantity of cores in operation (e.g., the operating states OS of the cores) and the temperature TEMP of the symmetric multi-processor 110 when the temperature TEMP of the symmetric multi-processor 110 is between the first threshold temperature and a second threshold temperature that is set to be higher than the first threshold temperature. Further, the SMP control unit 150 may differentially determine the maximum operating clock frequency for the cores of the symmetric multi-processor 110 based on the quantity of cores in operation (e.g., the operating states OS of the cores) and the temperature TEMP of the symmetric multi-processor 110, and may change a mode of at least one of the cores from the high performance operating mode to the low performance operating mode when the temperature TEMP of the symmetric multi-processor 110 is higher than the second threshold temperature. For example, the SMP control unit 150 may reduce the maximum operating clock frequency for the cores of the symmetric multi-processor 110 as the quantity of cores in operation increases at a specific temperature TEMP, and then may change a mode of at least one of the cores from the high performance operating mode to the low performance operating mode if the quantity of cores in operation becomes larger than a predetermined number at the specific temperature TEMP.

According to exemplary embodiments, the system-on-chip 100 may efficiently reduce heat and power consumption of the symmetric multi-processor 110 while sufficiently securing a time during which the symmetric multi-processor 110 operates with the maximum performance by determining the operating clock signal CLK and the operating states OS of the cores included in the symmetric multi-processor 110 based on the workload WL of the symmetric multi-processor 110, and by differentially determining the maximum operating clock frequency for the cores of the symmetric multi-processor 110 based on the quantity of cores in operation and the temperature TEMP of the symmetric multi-processor 110. In addition, the system-on-chip 100 may reduce the maximum operating clock frequency for the cores of the symmetric multi-processor 110 as the quantity of cores in operation increases at a specific temperature TEMP, and then may change a mode of at least one of the cores from the high performance operating mode to the low performance operating mode if the quantity of cores in operation becomes larger than the predetermined number at the specific temperature TEMP. As a result, the system-on-chip 100 according to exemplary embodiments may efficiently lower the temperature TEMP of the symmetric multi-processor 110 compared to methods that reduce only the maximum operating clock frequency for the cores of the symmetric multi-processor 110. In exemplary embodiments, the SMP control unit 150 of the system-on-chip 100 may differentially determine the maximum operating clock frequency for the cores of the symmetric multi-processor 110 in real-time while the symmetric multi-processor 110 operates, or while the symmetric multi-processor 110 does not operate. The first and second threshold temperatures may be variously set according to requirements of the symmetric multi-processor 110.

Figure 7:
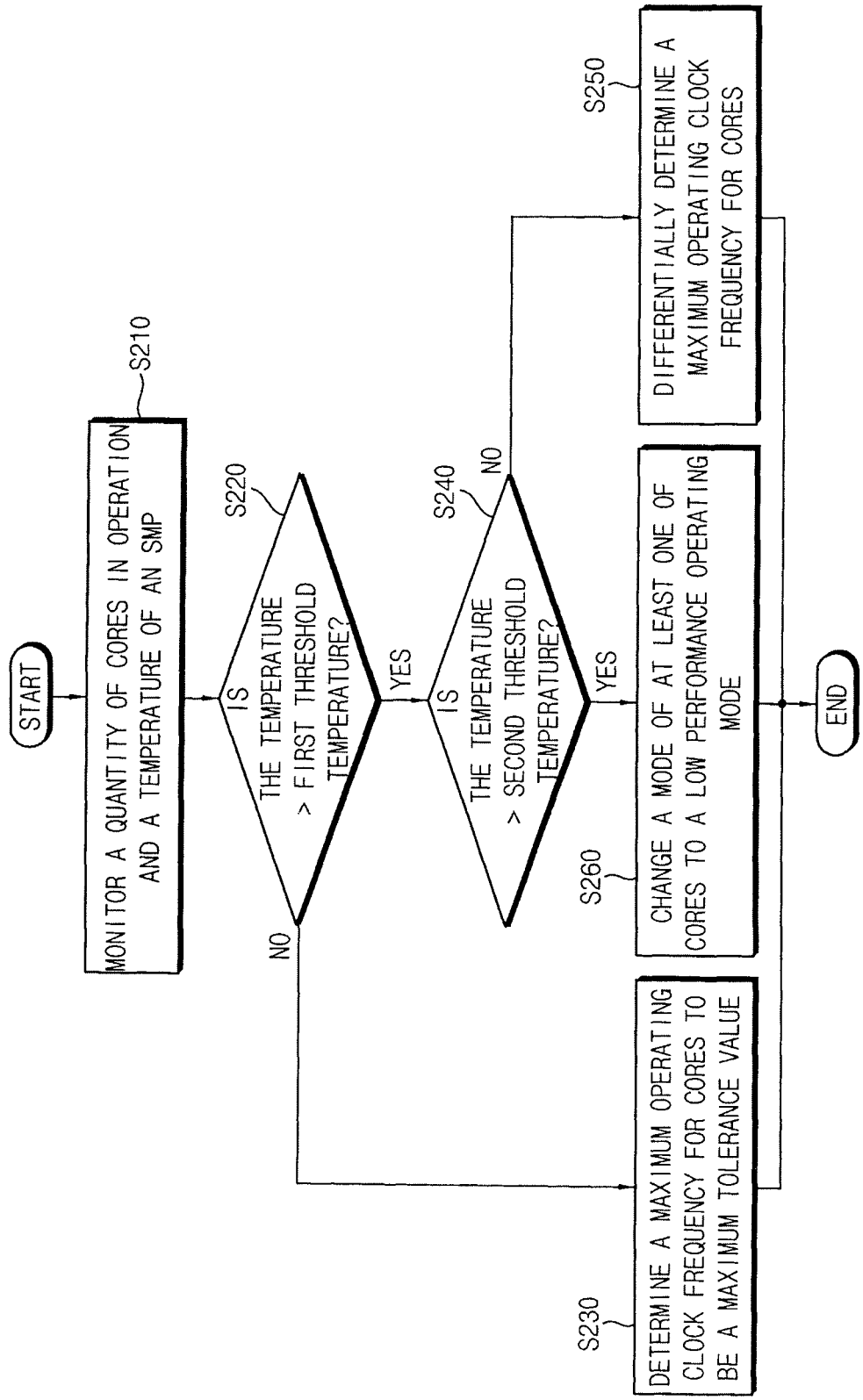
FIG. 7 is a flowchart illustrating an example in which a maximum operating clock frequency for a symmetric multi-processor included in the system-on-chip of FIG. 5 is determined.

FIG. 7 is a flowchart illustrating an example in which a maximum operating clock frequency for a symmetric multi-processor included in the system-on-chip of FIG. 5 is determined. FIG. 8 is a diagram illustrating an example in which a maximum operating clock frequency for a symmetric multi-processor included in the system-on-chip of FIG. 5 is determined.

Referring to FIGS. 7 and 8, it is illustrated that the system-on-chip 100 determines a maximum operating clock frequency of the symmetric multi-processor 110. The system-on-chip 100 may monitor a quantity of cores in operation (e.g., the operating states OS of the cores) and a temperature TEMP of the symmetric multi-processor 110 (S210), and may check whether the temperature TEMP of the symmetric multi-processor 110 is higher than a first threshold temperature (S220). When the temperature TEMP of the symmetric multi-processor 110 is lower than the first threshold temperature, the system-on-chip 100 may determine the maximum operating clock frequency for the cores of the symmetric multi-processor 110 to be a maximum tolerance value (S230). Alternatively, when the temperature TEMP of the symmetric multi-processor 110 is higher than the first threshold temperature, the system-on-chip 100 may check whether the temperature TEMP of the symmetric multi-processor 110 is higher than a second threshold temperature (S240). The second threshold temperature is set to be higher than the first threshold temperature. When the temperature TEMP of the symmetric multi-processor 110 is lower than the second threshold temperature, the system-on-chip 100 may differentially determine the maximum operating clock frequency for the cores of the symmetric multi-processor 110 based on the quantity of cores in operation (e.g., the operating states OS of the cores) and the temperature TEMP of the symmetric multi-processor 110 (S250). Alternatively, when the temperature TEMP of the symmetric multi-processor 110 is higher than the second threshold temperature, the system-on-chip 100 may differentially determine the maximum operating clock frequency for the cores of the symmetric multi-processor 110 based on the quantity of cores in operation (e.g., the operating states OS of the cores) and the temperature TEMP of the symmetric multi-processor 110, and may change a mode of at least one of the cores of the symmetric multi-processor 110 from a high performance operating mode to a low performance operating mode (S260).

As illustrated in FIG. 8, if the quantity of cores in operation is fixed in the symmetric multi-processor 110, the maximum operating clock frequency for the cores of the symmetric multi-processor 110 may decrease as the temperature TEMP of the symmetric multi-processor 110 increases. In addition, if the temperature TEMP of the symmetric multi-processor 110 is fixed, the maximum operating clock frequency for the cores of the symmetric multi-processor 110 may decrease as the quantity of cores in operation increases in the symmetric multi-processor 110. In FIG. 8, it is assumed that the first threshold temperature is 30° C., the second threshold temperature is 80° C., and the symmetric multi-processor 110 includes four cores. It is to be understood that the threshold temperatures and the number of cores in the symmetric multi-processor 110 are exemplary, and that the temperatures and number of cores are not limited thereto. In addition, the symmetric multi-processor 110 may correspond to a big-little processor, as described above. In this case, each of the four cores included in the symmetric multi-processor 110 may selectively operate in the high performance operating mode or in the low performance operating mode. Thus, when the temperature TEMP of the symmetric multi-processor 110 is lower than the first threshold temperature (e.g., 30° C.), the system-on-chip 100 may determine the maximum operating clock frequency for the cores of the symmetric multi-processor 110 to be the maximum tolerance value (e.g., 2000 MHz). That is, when the temperature TEMP of the symmetric multi-processor 110 is lower than the first threshold temperature (e.g., 30° C.), the maximum operating clock frequency for the cores of the symmetric multi-processor 110 may be determined to be the maximum tolerance value (e.g., 2000 MHz), regardless of the quantity of cores in operation (e.g., the operating states OS of the cores) and the temperature TEMP of the symmetric multi-processor 110. This approach may be taken because it may be unnecessary to limit the performance of the symmetric multi-processor 110 in a low temperature range of the symmetric multi-processor 110.

In addition, when the temperature TEMP of the symmetric multi-processor 110 is between the first threshold temperature (e.g., 30° C.) and the second threshold temperature (e.g., 80° C.), the system-on-chip 100 may differentially determine the maximum operating clock frequency for the cores of the symmetric multi-processor 110 based on the quantity of cores in operation (e.g., the operating states OS of the cores) and the temperature TEMP of the symmetric multi-processor 110. That is, as illustrated in FIG. 8, if the temperature TEMP of the symmetric multi-processor 110 is fixed, the maximum operating clock frequency for the cores of the symmetric multi-processor 110 may decrease as the quantity of cores in operation increases in the symmetric multi-processor 110. Similarly, if the quantity of cores in operation is fixed in the symmetric multi-processor 110, the maximum operating clock frequency for the cores of the symmetric multi-processor 110 may decrease as the temperature TEMP of the symmetric multi-processor 110 increases. For example, if the temperature TEMP of the symmetric multi-processor 110 is 60° C., the maximum operating clock frequency for the cores of the symmetric multi-processor 110 may be determined to be 2000 MHz when the quantity of cores in operation in the symmetric multi-processor 110 is 1, the maximum operating clock frequency for the cores of the symmetric multi-processor 110 may be determined to be 1700 MHz when the quantity of cores in operation in the symmetric multi-processor 110 is 2, the maximum operating clock frequency for the cores of the symmetric multi-processor 110 may be determined to be 1500 MHz when the quantity of cores in operation in the symmetric multi-processor 110 is 3, and the maximum operating clock frequency for the cores of the symmetric multi-processor 110 may be determined to be 1300 MHz when the quantity of cores in operation in the symmetric multi-processor 110 is 4. Similarly, if the quantity of cores in operation in the symmetric multi-processor 110 is 4, the maximum operating clock frequency for the cores of the symmetric multi-processor 110 may decrease as the temperature TEMP of the symmetric multi-processor 110 increases.

Further, when the temperature TEMP of the symmetric multi-processor 110 is higher than the second threshold temperature (e.g., 80° C.), the system-on-chip 100 may differentially determine the maximum operating clock frequency for the cores of the symmetric multi-processor 110 based on the quantity of cores in operation (e.g., the operating states OS of the cores) and the temperature TEMP of the symmetric multi-processor 110, and may change a mode of at least one of the cores included in the symmetric multi-processor 110 from the high performance operating mode to the low performance operating mode. That is, as illustrated in FIG. 8, if the temperature TEMP of the symmetric multi-processor 110 is fixed, the maximum operating clock frequency for the cores of the symmetric multi-processor 110 may decrease as the quantity of cores in operation increases in the symmetric multi-processor 110. In addition, a mode of at least one of the cores included in the symmetric multi-processor 110 may be changed from the high performance operating mode to the low performance operating mode when the quantity of cores in operation becomes larger than a predetermined number at the fixed temperature TEMP. For example, if the temperature TEMP of the symmetric multi-processor 110 is 90° C., the maximum operating clock frequency for the cores of the symmetric multi-processor 110 may be determined to be 1300 MHz when the quantity of cores in operation in the symmetric multi-processor 110 is 1, the maximum operating clock frequency for the cores of the symmetric multi-processor 110 may be determined to be 800 MHz when the quantity of cores in operation in the symmetric multi-processor 110 is 2, a mode of one core in operation of the symmetric multi-processor 110 may be changed from the high performance operating mode to the low performance operating mode when the quantity of cores in operation in the symmetric multi-processor 110 is 3, and a mode of two cores in operation of the symmetric multi-processor 110 may be changed from the high performance operating mode to the low performance operating mode when the quantity of cores in operation in the symmetric multi-processor 110 is 4. As described above, a situation in which a core operates in the high performance operating mode may indicate that a first sub-core (e.g., an ARM Cortex-A15) of the core operates, and a situation in which a core operates in the low performance operating mode may indicate that a second sub-core (e.g., an ARM Cortex-A7) of the core operates. It is to be understood that the ARM Cortex-A15 and ARM Cortex-A7 sub-cores are exemplary, and exemplary embodiments are not limited thereto.

FIGS. 9A through 9E are diagrams illustrating examples in which respective cores of a symmetric multi-processor included in the system-on-chip of FIG. 5 operate in a high performance operating mode or in a low performance operating mode.

Referring to FIGS. 9A through 9E, the symmetric multi-processor 110 included in the system-on-chip 100 may include first through fourth cores CORE1, CORE2, CORE3, and CORE4 that receive the same operating clock signal CLK to perform an equivalent operation. Each of the first through fourth cores CORE1, CORE2, CORE3, and CORE4 may include, for example, a first sub-core A15 that operates in a high performance operating mode and a second sub-core A7 that operates in a low performance operating mode. As described above, the first sub-cores A15 of the first through fourth cores CORE1, CORE2, CORE3, and CORE4 may constitute a first cluster CLUSTER1 of the symmetric multi-processor 110, and the second sub-cores A7 of the first through fourth cores CORE1, CORE2, CORE3, and CORE4 may constitute a second cluster CLUSTER2 of the symmetric multi-processor 110. For example, a situation in which a core (e.g., CORE1, CORE2, CORE3, or CORE4) operates in the high performance operating mode may indicate that the first sub-core A15 of the core (e.g., CORE1, CORE2, CORE3, or CORE4) operates, and a situation in which a core (e.g., CORE1, CORE2, CORE3, or CORE4) operates in the low performance operating mode may indicate that the second sub-core A7 of the core (e.g., CORE1, CORE2, CORE3, or CORE4) operates. In an exemplary embodiment, the symmetric multi-processor 110 may be a big-little processor, as described above. In this case, each of the cores CORE1, CORE2, CORE3, and CORE4 may operate in the high performance operating mode (e.g., BIG mode) or in the low performance operating mode (e.g., LITTLE mode).

Figure 9A:
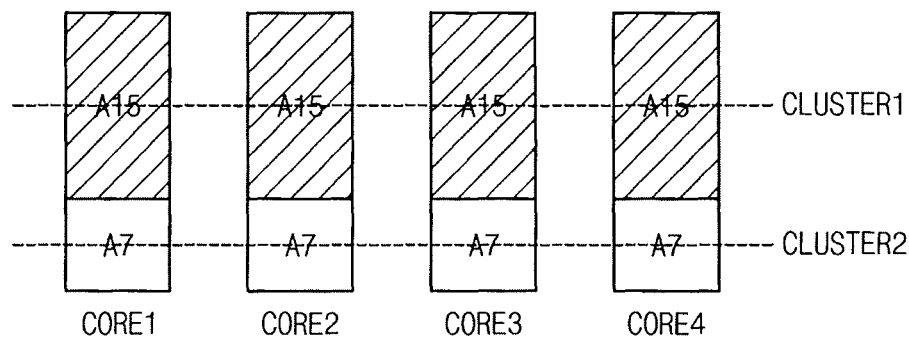
FIGS. 9A through 9E are diagrams illustrating examples in which respective cores of a symmetric multi-processor included in the system-on-chip of FIG. 5 operate in a high performance operating mode or in a low performance operating mode.
Figure 9B:
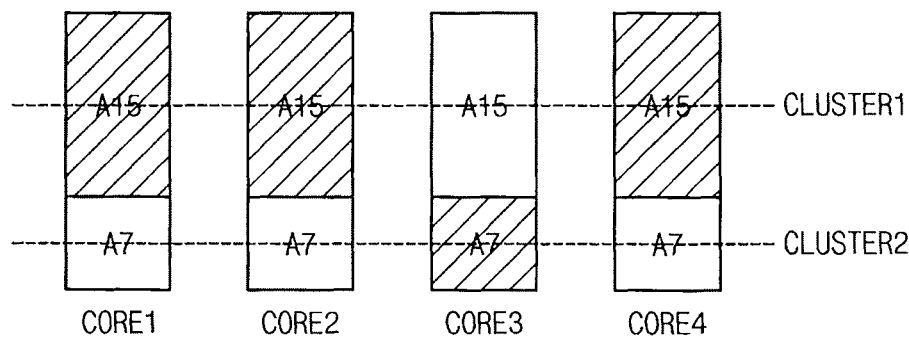
Figure 9C:
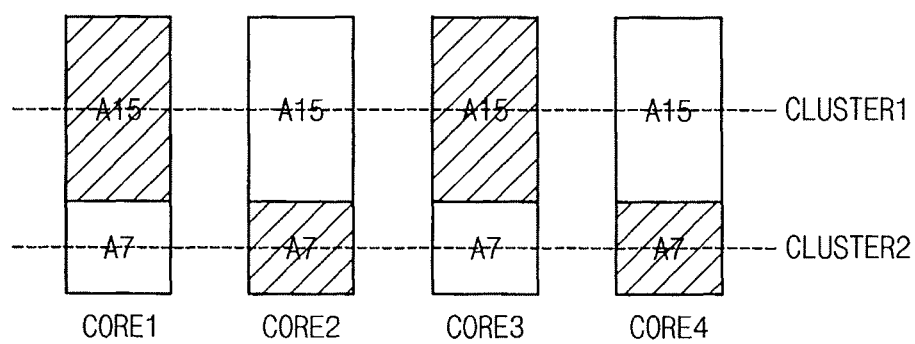
Figure 9D:
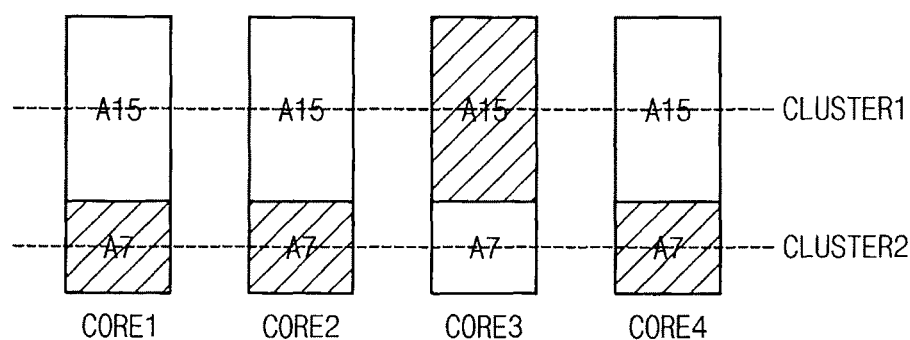
Figure 9E:
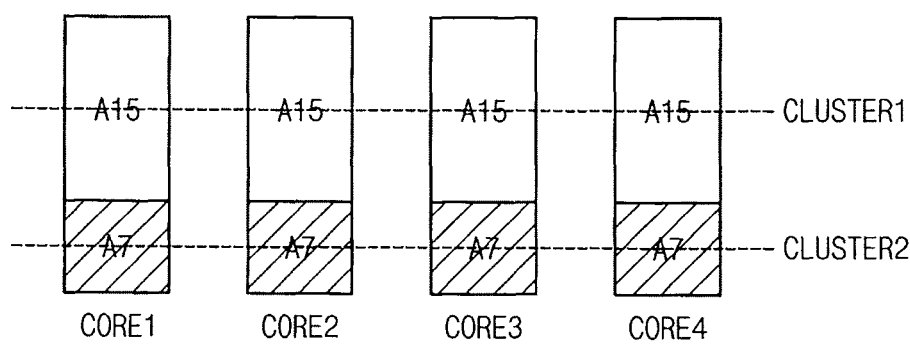

For example, when a temperature TEMP of the symmetric multi-processor 110 is lower than a first threshold temperature, a maximum operating clock frequency for the first through fourth cores CORE1, CORE2, CORE3, and CORE4 may be determined to be a maximum tolerance value. In addition, when the temperature TEMP of the symmetric multi-processor 110 is between the first threshold temperature and a second threshold temperature that is set to be higher than the first threshold temperature, the maximum operating clock frequency for the first through fourth cores CORE1, CORE2, CORE3, and CORE4 may be differentially determined based on a quantity of cores in operation (e.g., operating states OS of the first through fourth cores CORE1, CORE2, CORE3, and CORE4) and the temperature TEMP of the symmetric multi-processor 110. Thus, when the temperature TEMP of the symmetric multi-processor 110 is lower than the second threshold temperature, all of the first through fourth cores CORE1, CORE2, CORE3, and CORE4 may operate in the high performance operating mode (e.g., BIG mode). For example, as illustrated in FIG. 9A, when the temperature TEMP of the symmetric multi-processor 110 is lower than the second threshold temperature, all first sub-cores A15 of the first through fourth cores CORE1, CORE2, CORE3, and CORE4 may operate in the symmetric multi-processor 110. Further, when the temperature TEMP of the symmetric multi-processor 110 is higher than the second threshold temperature, the maximum operating clock frequency for the first through fourth cores CORE1, CORE2, CORE3, and CORE4 may be differentially determined based on the quantity of cores in operation (e.g., the operating states OS of the first through fourth cores CORE1, CORE2, CORE3, and CORE4) and the temperature TEMP of the symmetric multi-processor 110. In this case, a mode of at least one of the first through fourth cores CORE1, CORE2, CORE3, and CORE4 may be changed from the high performance operating mode to the low performance operating mode. For example, as illustrated in FIGS. 9B through 9E, at least one second sub-core A7 of the first through fourth cores CORE1, CORE2, CORE3, and CORE4 may operate in the symmetric multi-processor 110.

As described above, if the temperature TEMP of the symmetric multi-processor 110 is fixed, the maximum operating clock frequency for the first through fourth cores CORE1, CORE2, CORE3, and CORE4 may decrease as the quantity of cores in operation increases in the symmetric multi-processor 110. In addition, a mode of at least one of the first through fourth cores CORE1, CORE2, CORE3, and CORE4 may be changed from the high performance operating mode to the low performance operating mode when the quantity of cores in operation becomes larger than a predetermined number at the fixed temperature TEMP. Therefore, the system-on-chip 100 may efficiently reduce heat and power consumption of the symmetric multi-processor 110 because the system-on-chip 100 can change a mode of at least one of the first through fourth cores CORE1, CORE2, CORE3, and CORE4 from the high performance operating mode to the low performance operating mode, as well as reduce the maximum operating clock frequency for the first through fourth cores CORE1, CORE2, CORE3, and CORE4 based on the quantity of cores in operation (e.g., the operating states OS of the first through fourth cores CORE1, CORE2, CORE3, and CORE4) and the temperature TEMP of the symmetric multi-processor 110.

Figure 10:
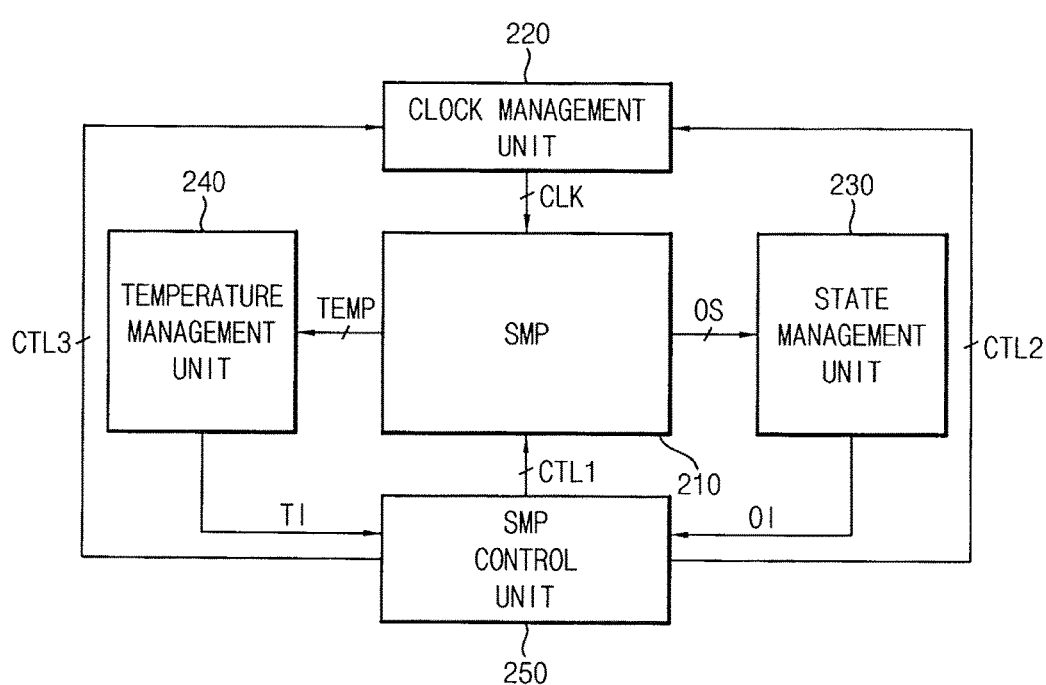
FIG. 10 is a block diagram illustrating a system-on-chip according to exemplary embodiment.

FIG. 10 is a block diagram illustrating a system-on-chip according to an exemplary embodiment.

Referring to FIG. 10, the system-on-chip 200 may include, for example, a symmetric multi-processor 210, a clock management unit 220, a state management unit 230, a temperature management unit 240, and an SMP control unit 250. In exemplary embodiments, the system-on-chip 200 may be an application processor.

The symmetric multi-processor 210 may include a plurality of cores (e.g., processors) that receive the same operating clock signal CLK to perform an equivalent operation. Thus, the cores may constitute one cluster of the symmetric multi-processor 210. The clock management unit 220 may provide the operating clock signal CLK to the symmetric multi-processor 210. The operating clock signal CLK may be determined by the SMP control unit 250 based on a workload WL of the symmetric multi-processor 210. For example, when the workload WL of the symmetric multi-processor 210 is relatively large, the clock management unit 220 may provide a relatively high operating clock signal CLK to the cores of the symmetric multi-processor 210 based on a control signal CTL2 output from the SMP control unit 250. Alternatively, when the workload WL of the symmetric multi-processor 210 is relatively small, the clock management unit 220 may provide a relatively low operating clock signal CLK to the cores of the symmetric multi-processor 210 based on the control signal CTL2 output from the SMP control unit 250.

The state management unit 230 may monitor operating states OS of the cores, and may provide information OI relating to the operating states OS of the cores to the SMP control unit 250. The operating states OS of the cores may include an active state and an inactive state. For example, the active state may correspond to an operating mode, and the inactive state may correspond to a non-operating mode. In exemplary embodiments, the state management unit 230 may be a power management unit (e.g., a power management integrated circuit) that is located internal or external to the system-on-chip 200, and the power management unit may monitor the operating states OS of the cores based on a voltage supplied to the system-on-chip 200. Alternatively, the state management unit 230 may be implemented using a separate circuit that monitors only the operating states OS of the cores of the symmetric multi-processor 200. The operating states OS of the cores may be determined by the SMP control unit 250 based on the workload WL of the symmetric multi-processor 210. For example, when the workload WL of the symmetric multi-processor 210 is relatively large, all cores of the symmetric multi-processor 210 may operate. Alternatively, when the workload WL of the symmetric multi-processor 210 is relatively small, some cores of the symmetric multi-processor 210 may operate. For example, the operating states OS of the cores of the symmetric multi-processor 210 may be determined in a manner in which the clock management unit 220 supplies or blocks the operating clock signal CLK to/from respective cores of the symmetric multi-processor 210. That is, when the workload WL of the symmetric multi-processor 210 is relatively large, the clock management unit 220 may supply the operating clock signal CLK to all cores of the symmetric multi-processor 210 based on a control signal CTL3 output from the SMP control unit 250. Alternatively, when the workload WL of the symmetric multi-processor 210 is relatively small, the clock management unit 220 may block the operating clock signal CLK from some cores of the symmetric multi-processor 210 based on the control signal CTL3 output from the SMP control unit 250.

The temperature management unit 240 may monitor a temperature TEMP of the symmetric multi-processor 210, and may provide information TI relating to the temperature TEMP of the symmetric multi-processor 210 to the SMP control unit 250. In exemplary embodiments, the temperature TEMP of the symmetric multi-processor 210 may be, for example, an average temperature of the cores of the symmetric multi-processor 210, or a maximum temperature from among temperatures of the cores of the symmetric multi-processor 210. However, a determination of the temperature TEMP of the symmetric multi-processor 210 is not limited thereto.

As described above, the SMP control unit 250 may determine the operating clock signal CLK that is provided to the symmetric multi-processor 210 and the operating states OS of the cores of the symmetric multi-processor 210 based on the workload WL of the symmetric multi-processor 210. Thus, the SMP control unit 250 may provide the control signals CTL2 and CTL3 to the clock management unit 220. In addition, the SMP control unit 250 may receive the information OI relating to the operating states OS of the cores from the state management unit 230, may receive the information TI relating to the temperature TEMP of the symmetric multi-processor 210 from the temperature management unit 240, and may differentially determine a maximum operating clock frequency for the cores of the symmetric multi-processor 210 based on a quantity of cores in operation (e.g., the operating states OS of the cores) and the temperature TEMP of the symmetric multi-processor 210. Thus, the SMP control unit 250 may provide a control signal CTL1 to the symmetric multi-processor 210. In an exemplary embodiment, the SMP control unit 250 may include, for example, a clock determination driver, a state determination driver, and a maximum operating clock frequency determination driver. The clock determination driver may determine the operating clock signal CLK that is provided to the symmetric multi-processor 210 based on the workload WL of the symmetric multi-processor 210. The state determination driver may determine the operating states OS of the cores of the symmetric multi-processor 210 based on the workload WL of the symmetric multi-processor 210. The maximum operating clock frequency determination driver may differentially determine the maximum operating clock frequency for the cores of the symmetric multi-processor 210 based on the quantity of cores in operation (e.g., the operating states OS of the cores) and the temperature TEMP of the symmetric multi-processor 210. In exemplary embodiments, the clock determination driver, the state determination driver, and the maximum operating clock frequency determination driver may be implemented using hardware (e.g., a circuit structure) and/or software (e.g., an operating system (OS), a computer program, etc).

The SMP control unit 250 may differentially determine the maximum operating clock frequency for the cores of the symmetric multi-processor 210 in an entire temperature range in which the symmetric multi-processor 210 is capable of operating. In an exemplary embodiment, the performance of the symmetric multi-processor 210 may be limited in a high temperature range of the symmetric multi-processor 210, and may not be limited in a low temperature range of the symmetric multi-processor 210. Thus, in an exemplary embodiment, the SMP control unit 250 may differentially determine the maximum operating clock frequency for the cores of the symmetric multi-processor 210 only in a temperature range that is higher than a predetermined threshold temperature. For example, the SMP control unit 250 may determine the maximum operating clock frequency for the cores of the symmetric multi-processor 210 to be a maximum tolerance value when the temperature TEMP of the symmetric multi-processor 210 is lower than a first threshold temperature. In addition, the SMP control unit 250 may differentially determine the maximum operating clock frequency for the cores of the symmetric multi-processor 210 based on the quantity of cores in operation (e.g., the operating states OS of the cores) and the temperature TEMP of the symmetric multi-processor 210 when the temperature TEMP of the symmetric multi-processor 210 is between the first threshold temperature and a second threshold temperature that is set to be higher than the first threshold temperature. Further, the SMP control unit 250 may differentially determine the maximum operating clock frequency for the cores of the symmetric multi-processor 210 based on the quantity of cores in operation (e.g., the operating states OS of the cores) and the temperature TEMP of the symmetric multi-processor 210, and may change a mode of at least one of the cores from the operating mode to the non-operating mode when the temperature TEMP of the symmetric multi-processor 210 is higher than the second threshold temperature. For example, the SMP control unit 250 may reduce the maximum operating clock frequency for the cores of the symmetric multi-processor 210 as the quantity of cores in operation increases at a specific temperature TEMP, and then may change a mode of at least one of the cores from the operating mode to the non-operating mode if the quantity of cores in operation becomes larger than a predetermined number at the specific temperature TEMP.

According to exemplary embodiments, the system-on-chip 200 may efficiently reduce heat and power consumption of the symmetric multi-processor 210 while sufficiently securing a time during which the symmetric multi-processor 210 operates with the maximum performance by determining the operating clock signal CLK and the operating states OS of the cores included in the symmetric multi-processor 210 based on the workload WL of the symmetric multi-processor 210, and by differentially determining the maximum operating clock frequency for the cores of the symmetric multi-processor 210 based on the quantity of cores in operation (e.g., the operating states OS of the cores) and the temperature TEMP of the symmetric multi-processor 210. In addition, the system-on-chip 200 may reduce the maximum operating clock frequency for the cores of the symmetric multi-processor 210 as the quantity of cores in operation increases at a specific temperature TEMP, and then may change a mode of at least one of the cores from the operating mode to the non-operating mode if the quantity of cores in operation becomes larger than the predetermined number at the specific temperature TEMP. As a result, the system-on-chip 200 according to exemplary embodiments may efficiently lower the temperature TEMP of the symmetric multi-processor 210 compared to methods that reduce only the maximum operating clock frequency for the cores of the symmetric multi-processor 210. In exemplary embodiments, the SMP control unit 250 of the system-on-chip 200 may differentially determine the maximum operating clock frequency for the cores of the symmetric multi-processor 210 in real-time while the symmetric multi-processor 210 operates, or while the symmetric multi-processor 110 does not operate. The first and second threshold temperatures may be variously set according to requirements of the symmetric multi-processor 210.

Figure 11:
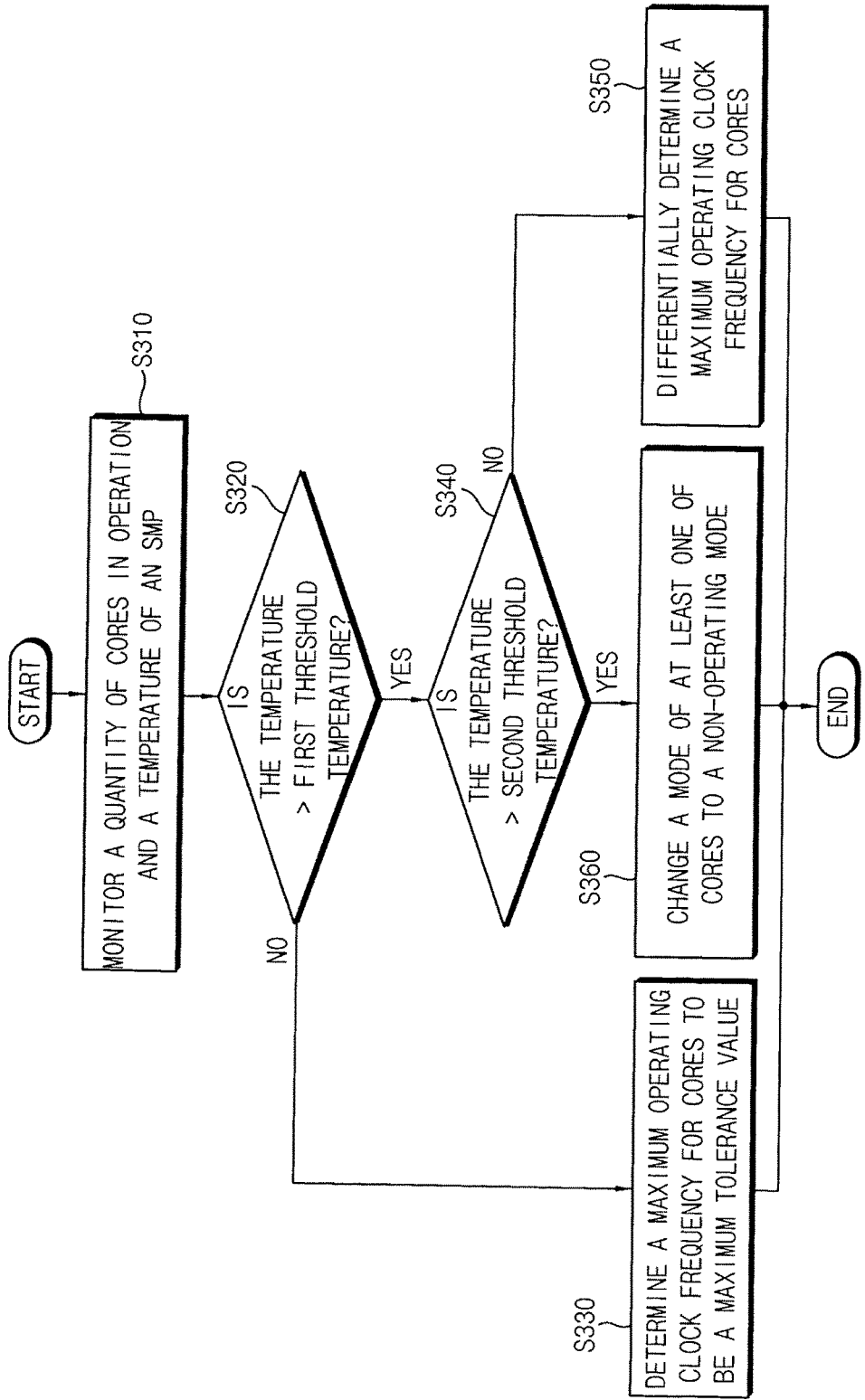
FIG. 11 is a flowchart illustrating an example in which a maximum operating clock frequency for a symmetric multi-processor included in the system-on-chip of FIG. 10 is determined.

FIG. 11 is a flowchart illustrating an example in which a maximum operating clock frequency for a symmetric multi-processor included in the system-on-chip of FIG. 10 is determined. FIG. 12 is a diagram illustrating an example in which a maximum operating clock frequency for a symmetric multi-processor included in the system-on-chip of FIG. 10 is determined.

Referring to FIGS. 11 and 12, it is illustrated that the system-on-chip 200 determines a maximum operating clock frequency of the symmetric multi-processor 210. The system-on-chip 200 may monitor a quantity of cores in operation (e.g., the operating states OS of the cores) and a temperature TEMP of the symmetric multi-processor 210 (S310), and may check whether the temperature TEMP of the symmetric multi-processor 210 is higher than a first threshold temperature (S320). When the temperature TEMP of the symmetric multi-processor 210 is lower than the first threshold temperature, the system-on-chip 200 may determine the maximum operating clock frequency for the cores of the symmetric multi-processor 210 to be a maximum tolerance value (S330). Alternatively, when the temperature TEMP of the symmetric multi-processor 210 is higher than the first threshold temperature, the system-on-chip 200 may check whether the temperature TEMP of the symmetric multi-processor 210 is higher than a second threshold temperature (S340). The second threshold temperature is set to be higher than the first threshold temperature. When the temperature TEMP of the symmetric multi-processor 210 is lower than the second threshold temperature, the system-on-chip 200 may differentially determine the maximum operating clock frequency for the cores of the symmetric multi-processor 210 based on the quantity of cores in operation (e.g., the operating states OS of the cores) and the temperature TEMP of the symmetric multi-processor 210 (S350). Alternatively, when the temperature TEMP of the symmetric multi-processor 210 is higher than the second threshold temperature, the system-on-chip 200 may differentially determine the maximum operating clock frequency for the cores of the symmetric multi-processor 210 based on the quantity of cores in operation (e.g., the operating states OS of the cores) and the temperature TEMP of the symmetric multi-processor 210, and may change a mode of at least one of the cores of the symmetric multi-processor 210 from an operating mode to a non-operating mode (S360).

As illustrated in FIG. 12, if the quantity of cores in operation is fixed in the symmetric multi-processor 210, the maximum operating clock frequency for the cores of the symmetric multi-processor 210 may decrease as the temperature TEMP of the symmetric multi-processor 210 increases. In addition, if the temperature TEMP of the symmetric multi-processor 210 is fixed, the maximum operating clock frequency for the cores of the symmetric multi-processor 210 may decrease as the quantity of cores in operation increases in the symmetric multi-processor 210. In FIG. 12, it is assumed that the first threshold temperature is 30° C., the second threshold temperature is 80° C., and the symmetric multi-processor 210 includes four cores. It is to be understood that the threshold temperatures and the number of cores in the symmetric multi-processor 210 are exemplary, and that the threshold temperatures and the number of cores are not limited thereto. Thus, when the temperature TEMP of the symmetric multi-processor 210 is lower than the first threshold temperature (e.g., 30° C.), the system-on-chip 200 may determine the maximum operating clock frequency for the cores of the symmetric multi-processor 210 to be the maximum tolerance value (e.g., 2000 MHz). That is, when the temperature TEMP of the symmetric multi-processor 210 is lower than the first threshold temperature (e.g., 30° C.), the maximum operating clock frequency for the cores of the symmetric multi-processor 210 may be determined to be the maximum tolerance value (e.g., 2000 MHz), regardless of the quantity of cores in operation (e.g., the operating states OS of the cores) and the temperature TEMP of the symmetric multi-processor 210. This approach may be taken because it may be unnecessary to limit the performance of the symmetric multi-processor 210 in a low temperature range of the symmetric multi-processor 210.

In addition, when the temperature TEMP of the symmetric multi-processor 210 is between the first threshold temperature (e.g., 30° C.) and the second threshold temperature (e.g., 80° C.), the system-on-chip 200 may differentially determine the maximum operating clock frequency for the cores of the symmetric multi-processor 210 based on the quantity of cores in operation (e.g., the operating states OS of the cores) and the temperature TEMP of the symmetric multi-processor 210. That is, as illustrated in FIG. 12, if the temperature TEMP of the symmetric multi-processor 210 is fixed, the maximum operating clock frequency for the cores of the symmetric multi-processor 210 may decrease as the quantity of cores in operation increases in the symmetric multi-processor 210. Similarly, if the quantity of cores in operation is fixed in the symmetric multi-processor 210, the maximum operating clock frequency for the cores of the symmetric multi-processor 210 may decrease as the temperature TEMP of the symmetric multi-processor 210 increases. For example, if the temperature TEMP of the symmetric multi-processor 210 is 60° C., the maximum operating clock frequency for the cores of the symmetric multi-processor 210 may be determined to be 2000 MHz when the quantity of cores in operation in the symmetric multi-processor 210 is 1, the maximum operating clock frequency for the cores of the symmetric multi-processor 210 may be determined to be 1700 MHz when the quantity of cores in operation in the symmetric multi-processor 210 is 2, the maximum operating clock frequency for the cores of the symmetric multi-processor 210 may be determined to be 1500 MHz when the quantity of cores in operation in the symmetric multi-processor 210 is 3, and the maximum operating clock frequency for the cores of the symmetric multi-processor 210 may be determined to be 1300 MHz when the quantity of cores in operation in the symmetric multi-processor 210 is 4. Similarly, if the quantity of cores in operation in the symmetric multi-processor 210 is 4, the maximum operating clock frequency for the cores of the symmetric multi-processor 210 may decrease as the temperature TEMP of the symmetric multi-processor 210 increases.

Further, when the temperature TEMP of the symmetric multi-processor 210 is higher than the second threshold temperature (e.g., 80° C.), the system-on-chip 200 may differentially determine the maximum operating clock frequency for the cores of the symmetric multi-processor 210 based on the quantity of cores in operation (e.g., the operating states OS of the cores) and the temperature TEMP of the symmetric multi-processor 210, and may change a mode of at least one of the cores included in the symmetric multi-processor 210 from the operating mode to the non-operating mode. That is, as illustrated in FIG. 12, if the temperature TEMP of the symmetric multi-processor 210 is fixed, the maximum operating clock frequency for the cores of the symmetric multi-processor 210 may decrease as the quantity of cores in operation increases in the symmetric multi-processor 210. In addition, a mode of at least one of the cores included in the symmetric multi-processor 210 may be changed from the operating mode to the non-operating mode when the quantity of cores in operation becomes larger than a predetermined number at the fixed temperature TEMP. For example, if the temperature TEMP of the symmetric multi-processor 210 is 90° C., the maximum operating clock frequency for the cores of the symmetric multi-processor 210 may be determined to be 1300 MHz when the quantity of cores in operation in the symmetric multi-processor 210 is 1, the maximum operating clock frequency for the cores of the symmetric multi-processor 210 may be determined to be 800 MHz when the quantity of cores in operation in the symmetric multi-processor 210 is 2, a mode of one core in operation of the symmetric multi-processor 210 may be changed from the operating mode to the non-operating mode when the quantity of cores in operation in the symmetric multi-processor 210 is 3, and a mode of two cores in operation of the symmetric multi-processor 210 may be changed from the operating mode to the non-operating mode when the quantity of cores in operation in the symmetric multi-processor 210 is 4. As described above, a situation in which a mode of a core is changed from the operating mode to the non-operating mode may indicate that an operating clock signal CLK is blocked from the core, that an operating voltage is blocked from the core, or that an operating system (OS) operates as if the core does not exist in the symmetric multi-processor 210.

FIGS. 13A through 13E are diagrams illustrating examples in which respective cores of a symmetric multi-processor included in the system-on-chip of FIG. 10 operate in a high performance operating mode or in a low performance operating mode.

Figure 13A:
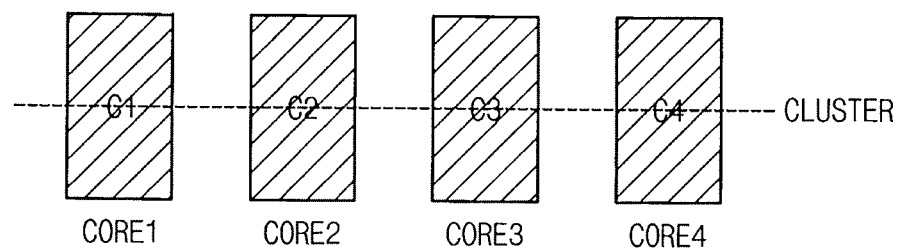
FIGS. 13A through 13E are diagrams illustrating examples in which respective cores of a symmetric multi-processor included in the system-on-chip of FIG. 10 operate in a high performance operating mode or in a low performance operating mode.
Figure 13B:
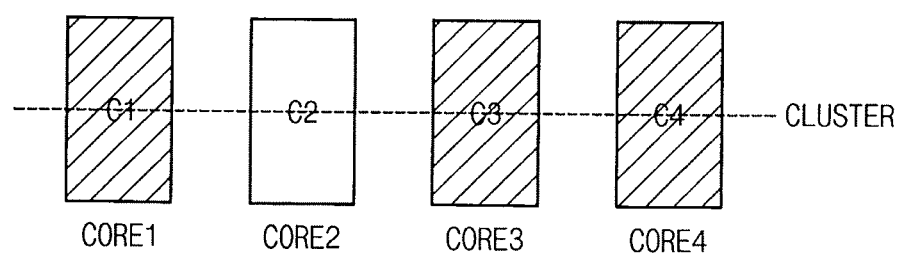
Figure 13C:
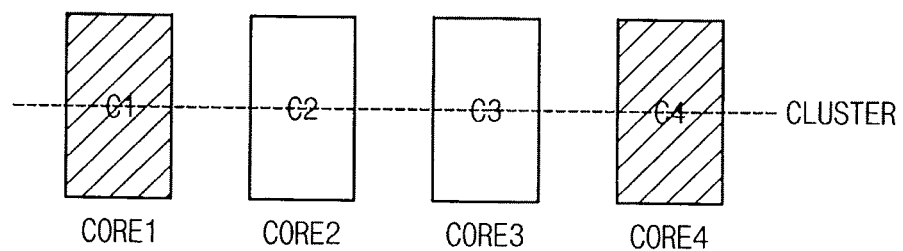
Figure 13D:
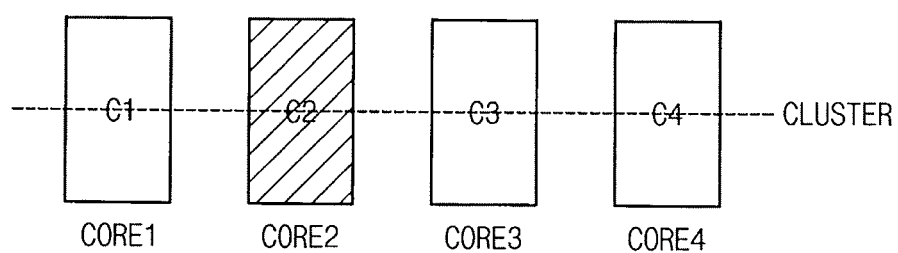
Figure 13E:
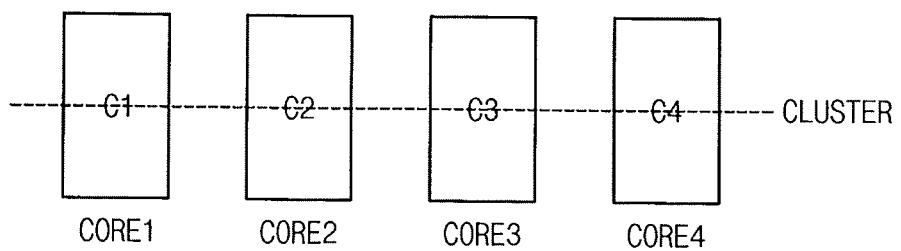

Referring to FIGS. 13A through 13E, the symmetric multi-processor 210 included in the system-on-chip 200 may include first through fourth cores CORE1, CORE2, CORE3, and CORE4 that receive the same operating clock signal CLK to perform an equivalent operation. The first through fourth cores CORE1, CORE2, CORE3, and CORE4 may constitute one cluster CLUSTER of the symmetric multi-processor 210. When a temperature TEMP of the symmetric multi-processor 210 is lower than a first threshold temperature, a maximum operating clock frequency for the first through fourth cores CORE1, CORE2, CORE3, and CORE4 may be determined to be a maximum tolerance value. In addition, when the temperature TEMP of the symmetric multi-processor 210 is between the first threshold temperature and a second threshold temperature that is set to be higher than the first threshold temperature, the maximum operating clock frequency for the first through fourth cores CORE1, CORE2, CORE3, and CORE4 may be differentially determined based on a quantity of cores in operation (e.g., operating states OS of the first through fourth cores CORE1, CORE2, CORE3, and CORE4) and the temperature TEMP of the symmetric multi-processor 210. For example, as illustrated in FIG. 13A, when the temperature TEMP of the symmetric multi-processor 210 is lower than the second threshold temperature, all of the first through fourth cores CORE1, CORE2, CORE3, and CORE4 may normally operate in the symmetric multi-processor 210. Alternatively, when the temperature TEMP of the symmetric multi-processor 210 is higher than the second threshold temperature, the maximum operating clock frequency for the first through fourth cores CORE1, CORE2, CORE3, and CORE4 may be differentially determined based on the quantity of cores in operation (e.g., the operating states OS of the first through fourth cores CORE1, CORE2, CORE3, and CORE4) and the temperature TEMP of the symmetric multi-processor 210. In this case, a mode of at least one of the first through fourth cores CORE1, CORE2, CORE3, and CORE4 may be changed from the operating mode to the non-operating mode. For example, as illustrated in FIGS. 13B through 13E, at least one of the first through fourth cores CORE1, CORE2, CORE3, and CORE4 may not operate in the symmetric multi-processor 210.

As described above, if the temperature TEMP of the symmetric multi-processor 210 is fixed, the maximum operating clock frequency for the first through fourth cores CORE1, CORE2, CORE3, and CORE4 may decrease as the quantity of cores in operation increases in the symmetric multi-processor 210. In addition, a mode of at least one of the first through fourth cores CORE1, CORE2, CORE3, and CORE4 may be changed from the operating mode to the non-operating mode when the quantity of cores in operation becomes larger than a predetermined number at the fixed temperature TEMP. For example, a situation in which a mode of a core (e.g., CORE1, CORE2, CORE3, or CORE4) is changed from the operating mode to the non-operating mode may indicate that an operating clock signal CLK is blocked from the core (e.g., CORE1, CORE2, CORE3, or CORE4), that an operating voltage is blocked from the core (e.g., CORE1, CORE2, CORE3, or CORE4), or that an operating system (OS) operates as if the core (e.g., CORE1, CORE2, CORE3, or CORE4) does not exist in the symmetric multi-processor 210. Therefore, the system-on-chip 200 may efficiently reduce heat and power consumption of the symmetric multi-processor 210 because the system-on-chip 200 can change a mode of at least one of the first through fourth cores CORE1, CORE2, CORE3, and CORE4 from the operating mode to the non-operating mode, as well as reduce the maximum operating clock frequency for the first through fourth cores CORE1, CORE2, CORE3, and CORE4 based on the quantity of cores in operation (e.g., the operating states OS of the first through fourth cores CORE1, CORE2, CORE3, and CORE4) and the temperature TEMP of the symmetric multi-processor 210.

Figure 14:
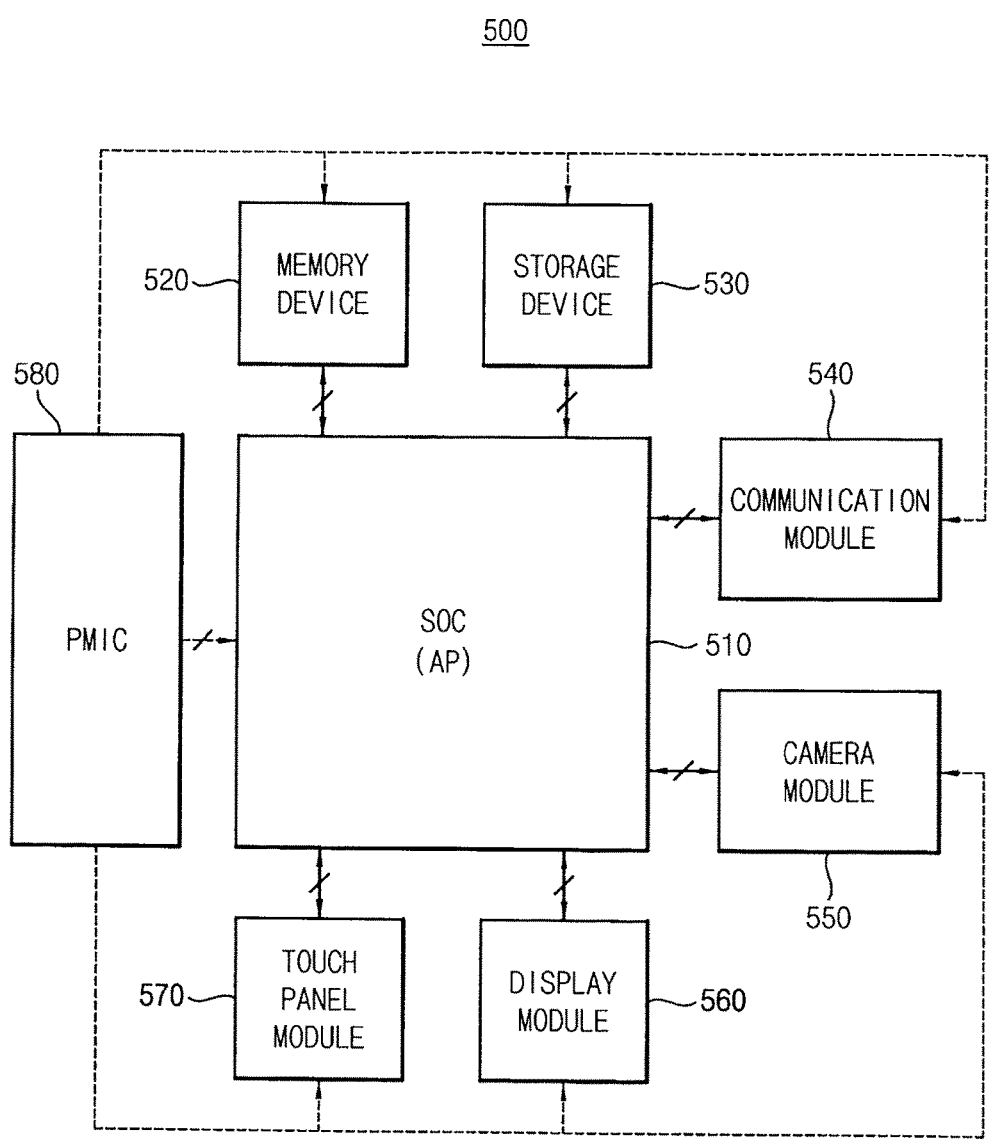
FIG. 14 is a block diagram illustrating a mobile device including a system-on-chip according to exemplary embodiments.
Figure 15:
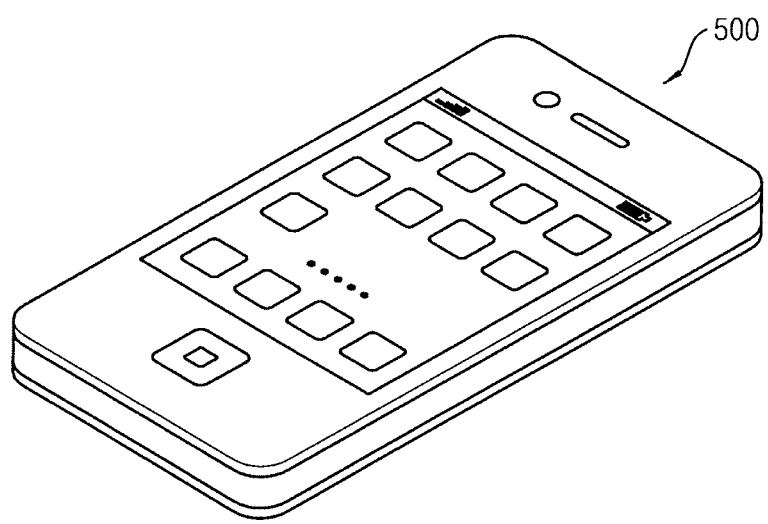
FIG. 15 is a diagram illustrating an example in which the mobile device of FIG. 14 is implemented as a smartphone.

FIG. 14 is a block diagram illustrating a mobile device including a system-on-chip according to exemplary embodiments. FIG. 15 is a diagram illustrating an example in which the mobile device of FIG. 14 is implemented as a smartphone.

Referring to FIGS. 14 and 15, the mobile device 500 may include an application processor 510, a memory device 520, a storage device 530, a plurality of function modules 540, 550, 560, and 570, and a power management integrated circuit 580. The power management integrated circuit 580 may provide respective voltages to the application processor 510, the memory device 520, the storage device 530, and the function modules 540, 550, 560, and 570. The application processor 510 may correspond to the system-on-chip 100 of FIG. 5 or the system-on-chip 200 of FIG. 10. In exemplary embodiments, as illustrated in FIG. 15, the mobile device 500 may be a smartphone.

The application processor 510 may control an overall operation of the mobile device 500. For example, the application processor 510 may control the memory device 520, the storage device 530, and the function modules 540, 550, 560, and 570. As described above, the application processor 510 may be implemented using a system-on-chip. In addition, the application processor 510 may include a symmetric multi-processor capable of high performance parallel processing, resulting in a mobile device having high performance. A plurality of cores (e.g., processors) of the symmetric multi-processor may receive the same operating clock signal to perform an equivalent operation. The application processor 510 may efficiently reduce heat and power consumption of the symmetric multi-processor while sufficiently securing a time during which the symmetric multi-processor operates with maximum performance by determining an operating clock signal and operating states of cores included in the symmetric multi-processor based on a workload of the symmetric multi-processor, and by differentially determining a maximum operating clock frequency for the cores based on a quantity of cores in operation (e.g., the operating states of the cores) and a temperature of the symmetric multi-processor. The application processor 510 may include a symmetric multi-processor having a plurality of cores, a clock management unit that provides an operating clock signal to the symmetric multi-processor, a state management unit that monitors operating states of the cores, a temperature management unit that monitors a temperature of the symmetric multi-processor, and a symmetric multi-processor (SMP) control unit that determines the operating clock and the operating states of the cores based on a workload of the symmetric multi-processor, and that differentially determines a maximum operating clock frequency for the cores based on the quantity of cores in operation (e.g., the operating states of the cores) and the temperature of the symmetric multi-processor. In exemplary embodiments, the cores may constitute one cluster or two or more clusters.

The memory device 520 and the storage device 530 may store data for implementing operations of the mobile device 500. In exemplary embodiments, the memory device 520 and the storage device 530 may be included in the application processor 510. For example, the memory device 520 may include a volatile semiconductor memory device such as a dynamic random access memory (DRAM) device, a static random access memory (SRAM) device, a mobile DRAM, etc. In addition, the storage device 530 may include a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. In exemplary embodiments, the storage device 530 may further include a solid state drive (SSD), a hard disk drive (HDD), a CD-ROM, etc. However, the memory device 520 and the storage device 530 are not limited thereto.

In addition, the function modules 540, 550, 560, and 570 may perform various functions of the mobile device 500. For example, the mobile device 500 may include a communication module 540 that performs a communication function (e.g., a code division multiple access (CDMA) module, a long term evolution (LTE) module, a radio frequency (RF) module, an ultra wideband (UWB) module, a wireless local area network (WLAN) module, a worldwide interoperability for microwave access (WIMAX) module, etc.), a camera module 550 that performs a camera function, a display module 560 that performs a display function, a touch panel module 570 that performs a touch-input sensing function, etc. It is to be understood that the function modules 540, 550, 560, and 570 shown in FIG. 14 and described herein are exemplary, and the function modules 540, 550, 560, and 570 are not limited thereto. For example, in exemplary embodiments, the mobile device 500 may include a global positioning system (GPS) module, a microphone (MIC) module, a speaker module, various sensor modules (e.g., a gyroscope sensor, a geomagnetic sensor, an acceleration sensor, a gravity sensor, an illumination sensor, a proximity sensor, a digital compass, etc.), etc. Although it is illustrated in FIGS.

14 and 15 that a system-on-chip according to exemplary embodiments is implemented as the application processor 510 of the mobile device 500, it is to be understood that the system-on-chip according to exemplary embodiments can be applied to any electronic device that operates using a symmetric multi-processor. That is, the system-on-chip is not limited to the application processor 510 of the mobile device 500.

Exemplary embodiments may be applied to a system-on-chip that includes a symmetric multi-processor, and an electronic device that includes the system-on-chip. For example, exemplary embodiments may be applied to a computer, a laptop, a digital camera, a cellular phone, a smartphone, a tablet computer, a personal digital assistant (PDA), a portable multimedia player (PMP), an MP3 player, a navigation system, a video camcorder, a portable game console, etc.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A system-on-chip, comprising:
a symmetric multi-processor comprising a plurality of cores, wherein each core is configured to operate in a high performance operating mode and a low performance operating mode;
a clock management unit configured to provide an operating clock signal to the symmetric multi-processor;
a state management unit configured to monitor operating states of the cores;
a temperature management unit configured to monitor a temperature of the symmetric multi-processor; and
a symmetric multi-processor control unit configured to determine the operating clock signal and the operating states of the cores based on a workload of the symmetric multi-processor, and to differentially determine a maximum operating clock frequency for the cores based on the temperature and the operating states of the cores,
wherein the operating states of the cores indicate a quantity of cores of the symmetric multi-processor that is currently in operation,
wherein, at each of a first given temperature and a second given temperature in a high temperature range, the maximum operating clock frequency of all of the cores currently in operation is different when the quantity of cores currently in operation is equal to a first value compared to when the quantity of cores currently in operation is equal to a second value,
wherein the maximum operating clock frequency of all of the cores currently in operation when the quantity of cores is equal to the first value at the first given temperature is different from the maximum operating clock frequency of all of the cores currently in operation when the quantity of cores is equal to the first value at the second given temperature, and the maximum operating clock frequency of all of the cores currently in operation when the quantity of cores is equal to the second value at the first given temperature is different from the maximum operating clock frequency of all of the cores currently in operation when the quantity of cores is equal to the second value at the second given temperature,
wherein the maximum operating clock frequency of the cores is differentially managed in the high temperature range, and the maximum operating clock frequency of the cores is the same at all temperatures in a low temperature range.

2. The system-on-chip of claim 1, wherein the symmetric multi-processor control unit is configured to differentially determine the maximum operating clock frequency for the cores while the symmetric multi-processor is operating.

3. The system-on-chip of claim 1, wherein each of the cores comprises:
a first sub-core configured to operate in the high performance operating mode, wherein the first sub-core constitutes a first cluster of the symmetric multi-processor; and
a second sub-core configured to operate in the low performance operating mode, wherein the second sub-core constitutes a second cluster of the symmetric multi-processor.

4. The system-on-chip of claim 3, wherein the symmetric multi-processor control unit is configured to differentially determine the maximum operating clock frequency for the cores based on the temperature and the operating states of the cores when the temperature is between a first threshold temperature and a second threshold temperature, wherein the second threshold temperature is higher than the first threshold temperature.

5. The system-on-chip of claim 4, wherein the symmetric multi-processor control unit is configured to determine the maximum operating clock frequency for the cores to be a maximum tolerance value when the temperature is lower than the first threshold temperature.

6. The system-on-chip of claim 4, wherein the symmetric multi-processor control unit is configured to change a mode of at least one of the cores from the high performance operating mode to the low performance operating mode when the temperature is higher than the second threshold temperature.

7. The system-on-chip of claim 1, wherein the system-on-chip is an application processor.

8. The system-on-chip of claim 7, wherein the state management unit is a power management configured to monitor the operating states of the cores based on a voltage supplied to the application processor.

9. A system-on-chip, comprising:
a symmetric multi-processor comprising a plurality of cores;
a clock management unit configured to provide an operating clock signal to the symmetric multi-processor;
a state management unit configured to monitor operating states of the cores, wherein the operating states of the cores indicate a quantity of cores of the symmetric multi-processor that is currently in an active state;
a temperature management unit configured to monitor a temperature of the symmetric multi-processor; and
a symmetric multi-processor control unit configured to determine the operating clock signal and the operating states of the cores based on a workload of the symmetric multi-processor, and to differentially determine a maximum operating clock frequency for the cores based on the temperature and the quantity of cores that is currently in the active state,
wherein, at each of a first given temperature and a second given temperature in a high temperature range, the maximum operating clock frequency of the cores that are currently in the active state is different when the quantity of cores currently in the active state is equal to a first value compared to when the quantity of cores currently in the active state is equal to a second value, wherein the maximum operating clock frequency of the cores currently in the active state when the quantity of cores is equal to the first value at the first given temperature is different from the maximum operating clock frequency of the cores currently in the active state when the quantity of cores is equal to the first value at the second given temperature, and the maximum operating clock frequency of the cores currently in the active state when the quantity of cores is equal to the second value at the first given temperature is different from the maximum operating clock frequency of the cores currently in the active state when the quantity of cores is equal to the second value at the second given temperature, wherein the maximum operating clock frequency of the cores is differentially managed in the high temperature range, and the maximum operating clock frequency of the cores is the same at all temperatures in a low temperature range.

10. The system-on-chip of claim 9, wherein the symmetric multi-processor control unit is configured to differentially determine the maximum operating clock frequency for the cores while the symmetric multi-processor is operating.

11. The system-on-chip of claim 9, wherein the symmetric multi-processor control unit is configured to differentially determine the maximum operating clock frequency for the cores based on the temperature and the quantity of cores that is currently in the active state when the temperature is between a first threshold temperature and a second threshold temperature, wherein the second threshold temperature is higher than the first threshold temperature.

12. The system-on-chip of claim 11, wherein the symmetric multi-processor control unit is configured to determine the maximum operating clock frequency for the cores to be a maximum tolerance value when the temperature is lower than the first threshold temperature.

13. The system-on-chip of claim 11, wherein the symmetric multi-processor control unit is configured to change a mode of at least one of the cores from an operating mode to a non-operating mode when the temperature is higher than the second threshold temperature.

14. The system-on-chip of claim 9, wherein the system-on-chip is an application processor.

15. The system-on-chip of claim 14, wherein the state management unit is a power management unit configured to monitor the operating states of the cores based on a voltage supplied to the application processor.

16. A method of determining a maximum operating clock frequency for a plurality of cores of a symmetric multi-processor, comprising:
monitoring operating states of the cores;
monitoring a temperature of the symmetric multi-processor;
determining an operating clock signal and the operating states of the cores based on a workload of the symmetric multi-processor; and
differentially determining the maximum operating clock frequency for the cores based on the temperature and the operating states of the cores, wherein the operating states of the cores indicate a quantity of cores of the symmetric multi-processor that is currently in operation, wherein, at each of a first given temperature and a second given temperature in a high temperature range, the maximum operating clock frequency of all of the cores currently in operation is different when the quantity of cores currently in operation is equal to a first value compared to when the quantity of cores currently in operation is equal to a second value, wherein the maximum operating clock frequency of all of the cores currently in operation when the quantity of cores is equal to the first value at the first given temperature is different from the maximum operating clock frequency of all of the cores currently in operation when the quantity of cores is equal to the first value at the second given temperature, and the maximum operating clock frequency of all of the cores currently in operation when the quantity of cores is equal to the second value at the first given temperature is different from the maximum operating clock frequency of all of the cores currently in operation when the quantity of cores is equal to the second value at the second given temperature, wherein the maximum operating clock frequency of the cores is differentially managed in the high temperature range, and the maximum operating clock frequency of the cores is the same at all temperatures in a low temperature range.

17. The method of claim 16, wherein the maximum operating clock frequency for the cores is differentially determined while the symmetric multi-processor is operating.

18. The method of claim 16, wherein each of the cores comprises:
a first sub-core configured to operate in a high performance operating mode, wherein the first sub-core constitutes a first cluster of the symmetric multi-processor; and
a second sub-core configured to operate in a low performance operating mode, wherein the second sub-core constitutes a second cluster of the symmetric multi-processor.

19. The method of claim 18, wherein the maximum operating clock frequency for the cores is differentially determined when the temperature is between a first threshold temperature and a second threshold temperature, wherein the second threshold temperature is higher than the first threshold temperature.

20. The method of claim 19, wherein the maximum operating clock frequency for the cores is determined to be a maximum tolerance value when the temperature is lower than the first threshold temperature.

* * * * *